US011913604B2

(12) United States Patent
Sassi et al.

(10) Patent No.: US 11,913,604 B2
(45) Date of Patent: Feb. 27, 2024

(54) SEALED WALL WITH REINFORCED CORRUGATED MEMBRANE

(71) Applicant: GAZTRANSPORT ET TECHNIGAZ, Saint Remy les Chevreuse (FR)

(72) Inventors: Mohamed Sassi, Saint Remy les Chevreuse (FR); Marc Boyeau, Saint Remy les Chevreuse (FR); Antoine Philippe, Saint Remy les Chevreuse (FR); Sébastien Delanoe, Saint Remy les Chevreuse (FR); Vincent Berger, Saint Remy les Chevreuse (FR); Johan Bougault, Saint Remy les Chevreuse (FR)

(73) Assignee: Gaztransport Et Technigaz, Saint Remy les Chevreuse (FR)

( * ) Notice: Subject to any disclaimer, the term of this patent is extended or adjusted under 35 U.S.C. 154(b) by 820 days.

(21) Appl. No.: 16/965,577

(22) PCT Filed: Feb. 1, 2019

(86) PCT No.: PCT/FR2019/050232
§ 371 (c)(1),
(2) Date: Jul. 28, 2020

(87) PCT Pub. No.: WO2019/150054
PCT Pub. Date: Aug. 8, 2019

(65) Prior Publication Data

US 2021/0071817 A1 Mar. 11, 2021

(30) Foreign Application Priority Data

Feb. 1, 2018 (FR) ...................................... 1850874
Mar. 23, 2018 (FR) ...................................... 1852568

(51) Int. Cl.
*F17C 13/00* (2006.01)
*B65D 90/02* (2019.01)
(Continued)

(52) U.S. Cl.
CPC .......... *F17C 13/004* (2013.01); *B65D 90/027* (2013.01); *B65D 90/041* (2013.01);
(Continued)

(58) Field of Classification Search
CPC .... F17C 13/004; F17C 3/04; F17C 2203/012; F17C 2203/0358; F17C 2205/0355;
(Continued)

(56) References Cited

U.S. PATENT DOCUMENTS 5,269,247 A * 12/1993 Jean ........................ F17C 3/025 114/74 A
6,035,795 A * 3/2000 Dhellemmes ........... F17C 3/025 220/901
(Continued)

FOREIGN PATENT DOCUMENTS

AU 2012201046 A1 3/2012
EP 2603729 A1 6/2013
(Continued)

OTHER PUBLICATIONS

International Search Report and Written Opinion from PCT/FR2019/050232 dated Feb. 1, 2018.
(Continued)

*Primary Examiner* — Justin M Jonaitis
(74) *Attorney, Agent, or Firm* — Blank Rome LLP

(57) ABSTRACT

Corrugated fluid-tight membrane fluid-tight wall (1) including two series of parallel corrugations forming a plurality of nodes (5) at the crossings of said series of corrugations, wave reinforcements (11) being arranged under the corrugations (3) of the first series of corrugations (3),
(Continued)

two successive wave reinforcements (11) in a corrugation (3) each including a hollow sole (15) and a reinforcement portion (16) disposed above the sole (15), the two wave reinforcements (11) being developed in the corrugation (3) on either side of a node (5), a connecting member (13) at the level of the node (5) being nested in the soles (15) of said two wave reinforcements (11) in such a manner as to assemble the two wave reinforcements (11) in an aligned position.

19 Claims, 15 Drawing Sheets

(51) Int. Cl.

| | |
|---|---|
| ***B65D 90/04*** | (2006.01) |
| ***B67D 7/38*** | (2010.01) |
| ***B67D 7/58*** | (2010.01) |
| ***B67D 9/00*** | (2010.01) |
| ***F17C 3/04*** | (2006.01) |

(52) U.S. Cl.

CPC ................. *B67D 7/38* (2013.01); *B67D 7/58* (2013.01); *B67D 9/00* (2013.01); *F17C 3/04* (2013.01); *B65D 2588/12* (2013.01); *F17C 2203/012* (2013.01); *F17C 2203/0358* (2013.01); *F17C 2205/0355* (2013.01); *F17C 2209/22* (2013.01); *F17C 2221/033* (2013.01); *F17C 2223/0161* (2013.01); *F17C 2260/011* (2013.01); *F17C 2270/0107* (2013.01)

(58) Field of Classification Search

CPC ............ F17C 2209/22; F17C 2221/033; F17C 2223/0161; F17C 2260/011; F17C 2270/0107; F17C 2270/01; B65D 90/027; B65D 90/041; B65D 2588/12; B67D 7/38; B67D 7/58; B67D 9/00; Y10S 220/901

USPC .............. 62/50.7; 220/560.12, 560.11, 592.2

See application file for complete search history.

(56) References Cited

U.S. PATENT DOCUMENTS

| | | | | |
|---|---|---|---|---|
| 8,985,042 B2 * | 3/2015 | Canler | B63B 25/16 220/560.07 |
| 2015/0132048 A1 * | 5/2015 | Bae | F17C 3/027 403/315 |
| 2015/0354756 A1 * | 12/2015 | Philippe | F17C 13/082 220/592.2 |
| 2017/0152993 A1 * | 6/2017 | Sassi | F17C 13/004 |
| 2017/0252790 A1 * | 9/2017 | Perrot | B21D 13/02 |
| 2017/0276295 A1 * | 9/2017 | Herry | F17C 3/027 |
| 2018/0202611 A1 * | 7/2018 | Sassi | B65D 90/22 |

FOREIGN PATENT DOCUMENTS

| | | | | |
|---|---|---|---|---|
| FR | 2861060 A1 | 4/2005 | |
| FR | 2936784 A1 | 4/2010 | |
| FR | 3 039 248 A1 | 1/2017 | |
| JP | 2011512287 A | 4/2011 | |
| KR | 20150098736 A | 8/2015 | |
| WO | WO-2012020194 A1 * | 2/2012 | F17C 3/025 |
| WO | WO-2017006044 A1 | 1/2017 | |
| WO | WO-2017017337 A1 | 2/2017 | |

OTHER PUBLICATIONS

Written Opinion from Singapore Patent Application No. 11202007296R dated Apr. 12, 2021.

International Search Report and Written Opinion for PCT/FR2019/050232, dated Mar. 29, 2019, 2 pages.

Decision to Grant dated May 16, 2023 issued in Japanese Patent Application No. 2020- 541666.

* cited by examiner

SEALED WALL WITH REINFORCED CORRUGATED MEMBRANE

RELATED APPLICATIONS

The present application is a national stage of International Application No. PCT/FR2019/050232, entitled Sealed Wall with Reinforced Corrugated Membrane, filed Feb. 1, 2019, which claims priority to French patent application nos. 1850874 and 1852568, the subject matter of each of which is incorporated herein by reference.

TECHNICAL FIELD

The invention relates to the field of corrugated metal membrane fluid-tight tanks for the storage and/or the transportation of a fluid, and in particular to fluid-tight and thermally insulative tanks for liquefied gas.

The invention relates in particular to the field of fluid-tight and thermally insulative tanks for the storage and/or the transportation of liquid at low temperature, such as tanks for the transportation of liquefied petroleum gas (LPG) at for example a temperature between −50° C. and 0° C. inclusive, or for the transportation of liquefied natural gas (LNG) at approximately −162° C. at atmospheric pressure. These tanks may be installed on land or on a floating structure. In the case of a floating structure, the tank may be intended for the transportation of liquefied gas or to receive liquefied gas serving as fuel for propelling the floating structure.

TECHNOLOGICAL BACKGROUND

There is described in FR-A-2936784 a corrugated fluid-tight membrane tank reinforced by means of wave reinforcements disposed under the corrugations, between the sealing membrane and the support of that sealing membrane, to reduce the stresses in the sealing membrane caused by a multitude of factors, including thermal shrinkage on cooling the tank, the effect of flexing of the beam of the ship, and the dynamic pressure caused by movement of the cargo, in particular because of the swell.

In a tank of this kind, the sealing membrane features two perpendicular series of corrugations. The fluid-tight membrane therefore features a plurality of nodes corresponding to the intersections between the corrugations of the series of corrugations.

In one embodiment, these reinforcing parts, also termed wave reinforcements, are hollow and allow the gas to circulate between the corrugations and the support via the reinforcing parts, notably for inerting the insulative barrier or detecting leaks. These reinforcing parts are arranged under the corrugations and between two successive nodes and are therefore interrupted at the level of said nodes.

SUMMARY

However, the applicant has realized that the stresses in the sealing membrane are not necessarily uniform in the tank. Thus the same corrugation may be subjected to asymmetrical stresses that can generate deformations of the membrane for which the reinforcing parts do not provide an adequate membrane reinforcement function. In particular, the applicant has realized that the reinforcing parts are subjected to conjoint displacements with the corrugation portion in which they are accommodated when said corrugation is subjected to asymmetrical stresses. This conjoint displacement of the reinforcement part and the corrugation can generate torsion of the membrane at the level of the node.

A basic idea of the invention is to provide a corrugated sealing membrane fluid-tight wall reinforced continuously along the corrugation. A basic idea of the invention is to ensure continuity of the wave reinforcements arranged in a corrugation. A basic idea of the invention is to ensure alignment of the wave reinforcements arranged under a corrugation to limit the risks of torsion of the membrane at the level of the node. Thus, a basic idea of the invention is to preserve an alignment of the wave reinforcements arranged under the successive portions of a corrugation corresponding to a longitudinal direction of said corrugation. In particular, a basic idea of the invention is to preserve the wave reinforcements arranged under a corrugation on either side of a node and aligned in the longitudinal direction of said corrugation.

In accordance with one embodiment, the invention provides a fluid-tight tank wall including a corrugated fluid-tight membrane, the corrugated fluid-tight membrane including a first series of parallel corrugations and a second series of parallel corrugations and plane portions situated between the corrugations and intended to rest on a support surface, said first and second series of corrugations extending in intersecting directions and forming a plurality of nodes at the crossings of said corrugations, wave reinforcements being arranged under the corrugations of the first series of corrugations, two successive wave reinforcements in a corrugation each including a sole intended to rest on the support surface and a reinforcement portion disposed above the sole in a thickness direction of the tank wall, the two wave reinforcements being developed longitudinally in the corrugation on either side of a node, said soles being hollow, a connecting member extending in the corrugation at the level of the node and being nested in the soles of said two wave reinforcements in such a manner as to assemble the two wave reinforcements in an aligned position.

Thanks to these features, continuity is ensured between two successive wave reinforcements arranged in a corrugation on either side of a node. Thanks to these features, the relative movement between two successive wave reinforcements arranged in the corrugation is limited, including in the presence of asymmetrical stresses on either side of the node and/or on either side of a corrugation. In particular, two successive wave reinforcements arranged under the corrugation are kept aligned in the longitudinal direction of the corrugation. Thus a portion of the corrugation situated on one side of the node is supported effectively by the wave reinforcement arranged under said corrugation portion, said wave reinforcement being retained in position by cooperation with the adjacent wave reinforcement via the connecting member.

Embodiments of such a wall may have one or more of the following features.

In one embodiment, the sole of one or each of said wave reinforcements features a respective projecting portion projecting longitudinally from the reinforcement portion of said wave reinforcement in the direction of the other wave reinforcement in such a manner to be engaged in the node.

Also, wave reinforcements of this kind are simple to fabricate, the projecting portion of the sole being fabricated, for example, from an extruded reinforcement part, simply by eliminating the reinforcement portion of the wave reinforcement at the level of said projecting portion.

In one embodiment, one end of the connecting member features a section of identical size and shape to the hollow section of the sole in which said end is accommodated, to achieve nesting with no significant play. In other words, the connecting member is nested and guided longitudinally in the soles with a simple assembly clearance so that the position of the two wave reinforcements is aligned without significant angular play.

The wave reinforcement is preferably mounted to slide relative to the support and said corrugation. Thus thermal contraction of the wave reinforcement can be produced without formation of local stresses. Moreover, the longitudinal nesting of the connecting member in the sole of the wave reinforcement also enables thermal contraction of the wave reinforcement and of the connecting member without producing local stresses.

In one embodiment, at least one of said wave reinforcements is associated with an attached spacer engaged in said node, an end face of the attached spacer opposite the node forming an abutment surface for an end face of the wave reinforcement facing the node, said attached spacer including a passage extending the hollow section of the sole of the wave reinforcement in the direction of the other wave reinforcement and having the connecting member passed through it.

In one embodiment, the attached spacer is fixed to the connecting member.

The sole of the wave reinforcement forms a bottom part of the wave reinforcement and the reinforcement portion forms a top part of the wave reinforcement. The sole and the reinforcement portion may be separated by a plane or non-plane internal wall. They may also not be separated. In one embodiment, the sole of one of said wave reinforcements includes a lower wall intended to rest on the support surface. In one embodiment, the sole of one of said wave reinforcements further includes an upper wall parallel to the lower wall intended to rest on the support surface, the reinforcement portion of said wave reinforcement extending over the upper wall of the sole.

In one embodiment, the sole is open on the reinforcement portion. In other words, a hollow internal housing of the sole in which the end of the connecting member is nested is open on the reinforcement portion.

In one embodiment, the wave reinforcement has an internal surface that is developed parallel to the lower wall of the sole and delimits the hollow housing of the sole.

This internal surface may be produced in numerous ways.

In one embodiment, this internal surface is formed by a face of the internal wall separating the reinforcement portion from the sole.

In one embodiment, this internal surface is formed by an end surface of an internal rib of the reinforcement portion. In one embodiment, this internal rib is developed in a plane parallel to the thickness direction of the tank wall from an internal web of the reinforcement portion, for example from an intersection zone between two internal webs accommodated in the reinforcement portion.

In one embodiment, this internal surface is formed by one or more lateral portions of an upper wall of the sole, said lateral portions being developed parallel to the lower wall from lateral walls of the wave reinforcement.

In one embodiment, one end of the connecting member nested in said sole features a plane, for example rectangular or trapezoidal, section extending parallel to said lower wall. Thanks to these features, the moment of inertia of the connecting member about a bending axis parallel to the thickness direction of the tank wall is relatively high.

Preferably in this case, one end of the connecting member nested in the sole has a width, measured in a width direction perpendicular to the thickness direction of the tank wall and perpendicular to the longitudinal direction of the corrugation, greater than the thickness of said end of the connecting member, measured in the thickness direction of the tank wall.

In one embodiment, the width of the end of the connecting member nested in the sole is greater than half the width of the wave reinforcement in said width direction. Such a width of the end of the connecting member allows good rigidity in response to the lateral stresses, that is to say in said width direction.

In one embodiment, the hollow portion of the sole has a plane section parallel to the support surface when the lower wall of said sole rests on said support surface. In other words, the hollow portion of the sole has a width measured in a direction perpendicular to the longitudinal direction of the corrugation and perpendicular to the thickness direction of the tank wall greater than the thickness of said hollow portion measured in the thickness direction of the tank wall.

In one embodiment, the end of the connecting member 13 is nested in the sole over a distance of 2 to 3 cm, or, preferably, over a distance greater than 5 cm, notably from 5 to 8 cm. Such an insertion direction ensures a large cooperation zone between the connecting member and the wave reinforcement, thus allowing and ensuring stable maintenance of the alignment between the wave reinforcements and good distribution of the lateral stresses over an extensive cooperation zone.

In one embodiment, said connecting member is a plane part that has a uniform thickness.

The connecting member in the form of a plane, that is to say thin, part has a low overall size in the thickness direction of the tank wall and is therefore able to pass under the fluid-tight membrane at the level of the node without interfering with the corrugations of the fluid-tight membrane.

In one embodiment, the soles have two internal walls developed in the thickness direction, said internal walls delimiting with the lower wall, and where applicable the upper wall, the hollow portion of the sole. In one embodiment, the hollow portion of the sole features a section of rectangular shape.

In one embodiment, the node includes a summit, said corrugation including on either side of the summit a concave portion forming a constriction of the corrugation, said projecting portion and/or the attached spacer extending in the node as far as the constriction of the corrugation situated on the corresponding side of the summit or beyond said constriction of the corrugation.

Said constriction defines for example a minimum section of the corrugation in the node.

In one embodiment, the connecting member includes an abutment surface adapted to limit the insertion of the connecting member into one of said soles.

In one embodiment, the abutment surface is a first abutment surface adapted to limit the insertion of the connecting member into one of the soles and the connecting member includes a second abutment surface adapted to limit the insertion of the connecting member in the other sole.

Abutment surfaces of this kind may be produced in numerous ways. In one embodiment, the connecting member includes an overthickness and/or an overwidth, the connecting member featuring at the level of said overthickness and/or overwidth a section the dimensions of which are greater than the dimensions of the hollow portion of the sole or soles, said overthickness and/or an overwidth carrying the abutment surface or surfaces. In one embodiment, the connecting member has a central portion having a uniform section in the longitudinal direction of the corrugation, the abutment surface or surfaces being formed by an attached part fixed to said central portion. This attached part may be produced in numerous ways, for example as a screw, a rivet, a nail fixed to the central portion of the connecting member, preferably without passing through it. This attached part may equally be a metal part fixed to the central portion of the connecting member. A metal part of this kind, being adapted to serve as an abutment for the first wave reinforcements, is for example a connecting part carrying connecting lugs intended to cooperate with the second wave reinforcements accommodated in the second corrugations.

In one embodiment, the connecting member is mounted to slide relative to the support surface, for example a thermal insulation barrier. In other words, the connecting member is not fixed to the thermal insulation barrier. Thus when neither the wave reinforcements nor the connecting members are fixed to the support surface, the wave reinforcements and the connecting members may be retained in position between the fluid-tight membrane and the support surface by virtue of the nesting between the wave reinforcements and the connecting member and the fixing of the fluid-tight membrane to the support surface, for example by welding.

In one embodiment, the wave reinforcements arranged under the corrugations of the first series of corrugations are first wave reinforcements, the tank further including second wave reinforcements arranged under corrugations of the second series of corrugations, two second wave reinforcements being disposed in the corrugation of the second series of corrugations forming the node on either side of said node.

In one embodiment, a second wave reinforcement extends between two successive nodes of a corrugation.

In one embodiment, the distance between the ends of the soles and/or between the ends of the attached spacers of the first two wave reinforcements is greater than a width of the second wave reinforcements arranged in the corrugation of the second series of corrugations forming the node, the connecting member including a central portion inserted between the soles of said first two wave reinforcements.

In one embodiment, the second reinforcements adjacent to the node have one end accommodated in the node in contact with the connecting member. Thanks to these features, the connecting member exercises an abutment function therefore limiting the movement of the second wave reinforcements in the longitudinal direction of the second corrugations.

In one embodiment, the second wave reinforcements are hollow, the connecting member including a central portion inserted between the soles of the first wave reinforcements, the connecting member further including two lugs, each of said two lugs projecting from the central portion of the connecting member in a longitudinal direction of the second series of corrugations and penetrating into a respective second wave reinforcement.

In one embodiment, the lugs are elastic lugs adapted to exert a force in a direction away from the fluid-tight membrane to press said second wave reinforcements onto the support surface.

In one embodiment, the two lugs are nested in the second wave reinforcements in such a manner as to assemble said two second wave reinforcements to the connecting member. For example, in this case the connecting member has a cruciform shape of which said lugs and said ends of the connecting member form four branches. The cruciform plane connecting member may be produced in the form of a plane part.

In one embodiment, the connecting member includes a cruciform plane part, said lugs and said ends of the connecting member forming four branches of the cross.

In one embodiment, the lugs and the central portion are of monobloc construction.

In one embodiment, an end of one of said lugs distant from the central portion includes a retaining member adapted to retain the second wave reinforcement in position.

A retaining member of this kind may be produced in numerous ways. In one embodiment, the second wave reinforcements include a mounting tab in their hollow portion, the end of the lugs being configured to cooperate with this tab in order to retain the second reinforcements. In one embodiment, the second wave reinforcements include internal webs, the end of the lugs being configured to be fixed, for example clipped, to an edge surface of said internal webs facing the node.

In one embodiment, the connecting member further includes a retaining plate fixed to the central portion of the connecting member, the plate carrying the lugs.

In one embodiment, the connecting member includes a fixing member of the plate, said fixing member being fixed in the base at a distance from the thermally insulative barrier.

In one embodiment, respective second wave reinforcements each include a hollow sole intended to rest on the support surface and a reinforcement portion disposed above the sole in the direction of the thickness of the tank wall. In this case, the two lugs of the connecting member may be nested longitudinally in said soles. This results in an assembly device of relatively small overall size in the direction of the thickness of the wall.

In one embodiment, the reinforcement portion of the wave reinforcement the sole of which includes said projecting portion has a bevelled end in the direction of the node.

In one embodiment, the reinforcement portion of the wave reinforcements has an external wall, for example of semi-elliptical convex external shape, delimiting an internal space of the reinforcement portion, the reinforcement portion further including internal reinforcement webs.

In one embodiment, such internal webs are developed between a respective sole upper wall lateral portion and an internal face of the external wall of the reinforcement portion.

In one embodiment, the reinforcement portion of the wave reinforcements has an external wall, an end of said external wall facing the node forming an edge surface of said external wall, said edge surface being bevelled in such a manner as to have a face inclined relative to a plane perpendicular to the longitudinal direction of the corrugation and facing toward the corrugation.

In one embodiment, the corrugated fluid-tight membrane includes a corrugated rectangular sheetmetal part, said first series of corrugations extending in a lengthwise direction of the sheetmetal part, said second series of corrugations extending in a widthwise direction of the sheetmetal part, and the wave reinforcements arranged under a corrugation of the first series of corrugations include a row of aligned wave reinforcements, said row of wave reinforcements being developed over all the length of the rectangular sheetmetal part, said wave reinforcements each including a hollow sole and a reinforcement portion and being assembled two by two by a plurality of connecting members nested in the soles of the successive wave reinforcements at the level of the nodes.

In one embodiment, the corrugated fluid-tight membrane includes a corrugated rectangular sheetmetal part, said first series of corrugations extending in a lengthwise direction of the sheetmetal part, said second series of corrugations extending in a widthwise direction of the sheetmetal part, and the wave reinforcements arranged under a corrugation of the first series of corrugations include a row of aligned wave reinforcements, said row of wave reinforcements being developed over substantially all the length of the rectangular sheetmetal part, said wave reinforcements each including a hollow sole including a lower wall intended to rest on the support surface and a reinforcement portion disposed above the sole, and being assembled two by two by a plurality of connecting members nested in the soles of the successive wave reinforcements at the level of the nodes of said corrugation.

In one embodiment, the two ends of the row of wave reinforcements are fixed, for example clipped, to the edges of the rectangular sheetmetal part delimiting the corrugation. It is therefore possible to handle the sheetmetal part with one or more rows of wave reinforcements preassembled thereto in this way, which facilitates the assembly of a tank wall.

In one embodiment, a plurality of rows of wave reinforcements constituted in the same manner are arranged in the respective corrugations of the first series of corrugations over all the length of the rectangular sheetmetal part, for example in each of the corrugations or in only some of them, and may be fixed to the rectangular sheetmetal part in the same manner.

In one embodiment, rows of wave reinforcements are arranged in the corrugations of the second series of corrugations. These wave reinforcements may be fixed in various ways, for example by cooperation with the connecting members. In one embodiment, the wave reinforcements arranged in the corrugations of the second series of corrugations are fixed to the corrugated sheetmetal part, for example by means of double-sided adhesive tape or by gluing.

In one embodiment, a plurality of rows of wave reinforcements are arranged in the respective corrugations of the first series of corrugations over substantially all the length of the rectangular sheetmetal part and rows of second wave reinforcements are arranged in the corrugations of the second series of corrugations, the second wave reinforcements being assembled to the first wave reinforcements by cooperation with the cruciform connecting members at the level of the nodes to form a framework of the corrugated rectangular sheetmetal part.

A framework of this kind may be pre-assembled onto the external surface of the rectangular sheetmetal part and fixed to the latter as indicated above. A framework of this kind may also be preassembled independently of the rectangular sheetmetal part intended to receive it, for example by means of a mounting frame. The preassembly of a framework of this kind facilitates the assembly of the tank wall by limiting handling operations.

In one embodiment, the fluid-tight membrane includes a second corrugated rectangular sheetmetal part juxtaposed to the first corrugated rectangular sheetmetal part in the lengthwise direction and welded to the latter in fluid-tight manner, the second corrugated rectangular sheetmetal part being provided with a second framework formed of first and second wave reinforcements arranged in the corrugations of the second corrugated rectangular sheetmetal part and assembled by a plurality of connecting members nested in said wave reinforcements at the level of the nodes of the second corrugated rectangular sheetmetal part.

A first end reinforcement forming the end of a row of first wave reinforcements of the first framework may be associated with a second end reinforcement forming the end of a row of first wave reinforcements of the second framework by a connecting sleeve, the first and second end reinforcements each including a longitudinal housing opening onto a lower surface of the end reinforcement, the connecting sleeve being nested in the longitudinal housing of the first and second end reinforcements in such a manner as to align the row of wave reinforcements of the first framework and the row of wave reinforcements of the second framework.

In one embodiment, the invention also provides an assembly forming a preassembled framework for membranes, said framework including wave reinforcements intended to be accommodated under corrugations of a corrugated sealing membrane including two series of intersecting corrugations, one of said wave corrugations including a plane lower surface intended to rest on a support surface and an internal housing adjacent to the lower wall, said framework including with a plurality of rows of aligned first wave reinforcements, each row being intended to be accommodated under a corrugation of the first series of corrugations of the fluid-tight membrane, said framework including a plurality of rows of aligned second wave reinforcements, each row being intended to be accommodated under a corrugation of the second series of corrugations of the sealing membrane, said framework further including a plurality of cruciform connecting members including lugs accommodated in the housings of the first and second wave reinforcements at the level of the intersection of the rows of first wave reinforcements and the rows of second wave reinforcements, said assembly further including an assembly frame arranged around ends of the rows of wave reinforcements and including attachments cooperating with end reinforcements arranged at the ends of the rows of first wave reinforcements and the rows of second wave reinforcements in such a manner as to retain the assembly in an assembled state.

In a preassembled framework of this kind the wave reinforcements are assembled by the cruciform connecting members and by the assembly frame in the form of a lattice of wave reinforcements.

In one embodiment, the end first wave reinforcements and the end second wave reinforcements include an open housing opening onto the lower surface of said end first and second wave reinforcements.

In one embodiment, the assembly frame is replaced by a corrugated metal plate intended to form a portion of the sealing membrane and the attachments are arranged at the edges of the metal plate.

In one embodiment, the invention also provides a fluid-tight tank wall assembly method for assembling a tank wall including the steps of:

positioning on a fluid-tight tank support surface, preferably for each first corrugation of a sealing membrane, corrugated rectangular sheetmetal part, a row of first wave reinforcements, said row being formed by alternately nesting connecting members and first wave reinforcements, notably the aforementioned connecting member and the aforementioned first wave reinforcements, maintaining the ends of said row of first wave reinforcements in position on the support surface, positioning on the support surface, preferably for each second corrugation of the corrugated rectangular sheetmetal part, second wave reinforcements, fixing onto the support surface the corrugated rectangular sheetmetal part so that the row of first wave reinforcements is accommodated in a corresponding first corrugation of said corrugated rectangular sheetmetal part and the second wave reinforcements are accommodated in a corresponding second corrugation of the corrugated rectangular sheetmetal part.

In one embodiment, the step of retaining the ends of the row of first wave reinforcements includes the steps of positioning a connecting member in a first wave reinforcement projecting from a corrugated rectangular sheetmetal part previously fixed to the support surface, nesting in said connecting member an end first wave reinforcement of the row of first wave reinforcements.

In one embodiment, the step of retaining the ends of the row of first wave reinforcements includes the step of fixing a fixing rail to the support surface, said fixing rail cooperating with an end first wave reinforcement of the row of first wave reinforcements to retain the corresponding end of the row of first wave reinforcements on the support surface.

In one embodiment, the method further includes a step of removing the fixing rail from the support surface.

In one embodiment, the fixing rail cooperates with the end of a plurality of rows of adjacent first wave reinforcements positioned on the support surface in order to stabilize the position of said rows of first wave reinforcements.

In one embodiment, the step of positioning the second wave reinforcements includes the step of nesting said second wave reinforcements in adjacent connecting members of two rows of adjacent first wave reinforcements.

In one embodiment, the step of anchoring the corrugated rectangular sheetmetal part to the support surface includes the step of welding said corrugated rectangular sheetmetal part to a corrugated rectangular sheetmetal part previously anchored to the thermally insulative barrier.

In one embodiment, the invention also provides a wave reinforcement intended to be accommodated under a corrugation of a corrugated sealing membrane, the wave reinforcement including a hollow sole and a hollow reinforcement portion disposed above said sole, the sole including a plane lower wall intended to rest on a support surface and an upper wall separating the sole from the reinforcement portion and parallel to said lower surface, the lower wall and the upper wall being connected by lateral walls of the sole, the reinforcement portion including an external wall extending above the sole, said external wall delimiting with the upper wall of the sole an internal space of the reinforcement portion.

Embodiments of a wave reinforcement of this kind may include one or more of the following features.

In one embodiment, the wave reinforcement further includes an internal web arranged in the internal space of the reinforcement portion. In one embodiment, this internal web features a circular shape truncated by the upper wall of the sole, said internal web being tangential to the external wall on either side of the summit of said external wall.

In one embodiment, the sole features a projecting portion projecting longitudinally relative to the reinforcement portion at the level of at least one longitudinal end of the wave reinforcement.

In one embodiment, the invention also provides a wave reinforcement intended to be accommodated under a corrugation of a fluid-tight and thermally insulative tank sealing membrane, said wave reinforcement including a plane wall intended to rest on a support surface and an external wall conjointly delimiting therewith an internal space of said wave reinforcement, the wave reinforcement further including in said internal space an internal web having a circular shape truncated by the plane wall, said internal web being tangential to the external wall on either side of a summit of said external wall.

In one embodiment, the external wall has a semi-elliptical convex shape.

A tank wall of this kind may form part of a land storage installation, for example for storage of LNG, or be installed on a floating structure, for coastal or deep water use, notably a methane tanker ship or any ship using a combustible liquefied gas as a fuel, a Floating Storage and Regassification Unit (FSRU), a Floating Production Storage and Offloading (FPSO) installation, etc.

In one embodiment, the invention provides a ship for the transportation of a cold liquid product that includes a double hull and a tank including the aforementioned fluid-tight wall disposed in the double hull.

In one embodiment, the invention also provides a method of loading or offloading a ship of this kind, in which a cold liquid product is fed through insulated pipes from or to a floating or land storage installation to or from the tank of the ship.

In one embodiment, the invention also provides a cold liquid product transfer system, the system including the aforementioned ship, insulated pipes adapted to connect the tank installed in the hull of the ship to a floating or land storage installation and a pump for driving a flow of cold liquid product through the insulated pipes from or to the floating or land storage installation to or from the tank of the ship.

BRIEF DESCRIPTION OF THE FIGURES

The invention will be better understood, and other aims, details, features and advantages thereof will become more clearly apparent in the course of the following description of particular embodiments of the invention, provided by way of nonlimiting illustration only, with reference to the appended drawings.

DETAILED DESCRIPTION OF EMBODIMENTS

By convention, the terms "external" and "internal" are used to define the position of one element relative to another one, with reference to the interior and the exterior of the tank.

A fluid-tight and thermally insulative tank for the storage and the transportation of a cryogenic fluid, for example liquefied natural gas (LNG), includes a plurality of tank walls each having a multilayer structure.

A tank wall of this kind includes, from the exterior to the interior of the tank, a thermal insulation barrier anchored to a supporting structure by retaining members and a sealing membrane carried by the thermal insulation barrier and intended to be in contact with the cryogenic fluid contained in the tank.

The supporting structure may in particular be a self-supporting metal plate or, more generally, any type of rigid partition having appropriate mechanical properties. The supporting structure may in particular be formed by the hull or the double hull of a ship. The supporting structure includes a plurality of walls defining the general shape of the tank, usually a polyhedral shape.

The tank may also include a plurality of thermal insulation barriers and sealing membranes. For example, from the exterior to the interior of the tank, a tank may include a secondary thermal insulation barrier anchored to the supporting structure, a secondary sealing membrane carried by the secondary thermal insulation barrier, a primary thermal insulation barrier resting on the secondary sealing membrane and a primary sealing membrane resting on the primary thermal insulation barrier. The thermal insulation barrier may be produced in numerous ways, in numerous materials and by known techniques such as, for example, described in the document WO2017017337 or WO2017006044. The sealing membranes may consist of corrugated rectangular metal parts including series of corrugations of different or similar sizes.

Figure 1:
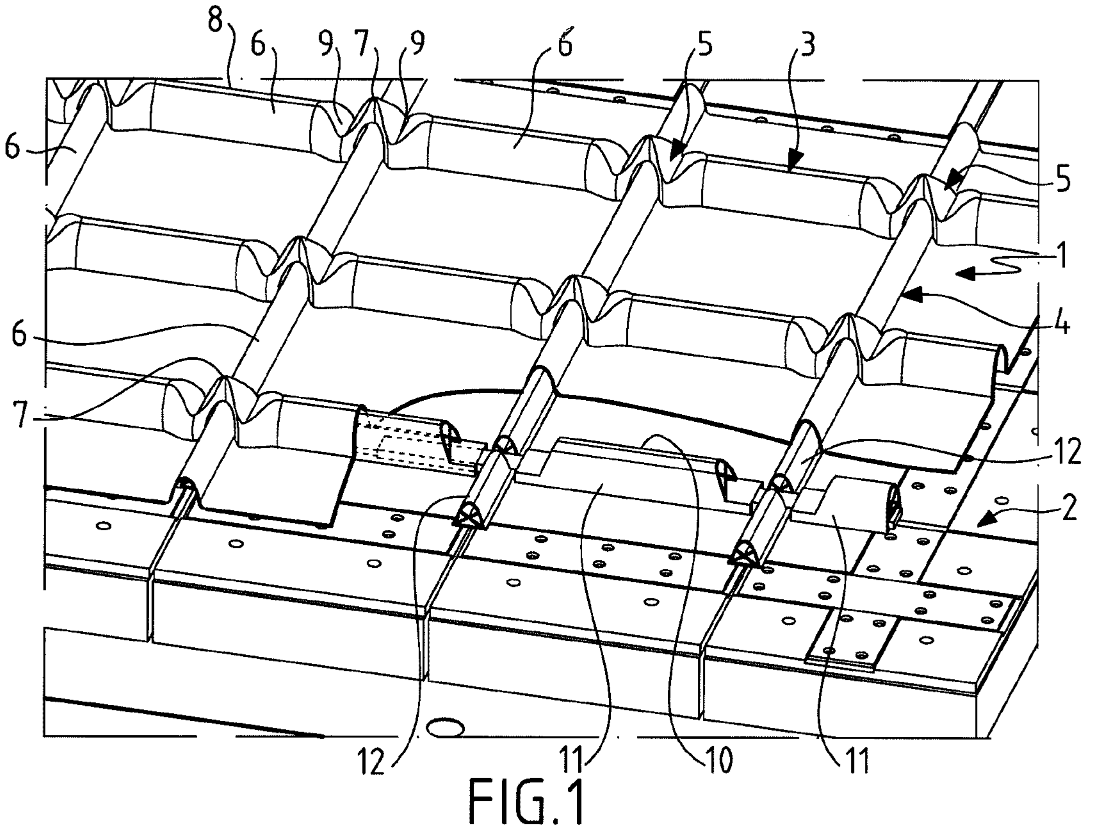
FIG. 1 is a diagrammatic perspective view of a fluid-tight and thermally insulative tank wall portion in which the sealing membrane is partially shown.

FIG. 1 shows part of a sealing membrane 1 intended to be in contact with the fluid contained in the tank and anchored to a thermally insulating barrier 2. This sealing membrane 1 includes a plurality of corrugated metal plates of rectangular shape anchored to the thermally insulating barrier 2. The sealing membrane 1 includes a first series of parallel corrugations, termed high corrugations 3, extending in a first direction, and a second series of parallel corrugations, termed low corrugations 4, extending in a second direction. Here the terms "high" and "low" have a relative meaning and mean that the first series of corrugations 3 has a greater height than the second series of corrugations 4. The first and second directions are perpendicular. The high corrugations 3 therefore form with the low corrugations 4 nodes 5 at the level of each intersection between them. In other words, each corrugation 3, 4 includes a succession of longitudinal portions 6 and nodes 5, said nodes being formed by the intersection of said corrugations 3, 4 with a perpendicular corrugation 4, 3. Longitudinal portions 6 of this kind have a substantially constant section, the change of section of the corrugation 3, 4 at the level of the intersection between two corrugations 3, 4 marking the beginning of the node 5. However, the longitudinal portion 6 may include local deformations (not shown) such as described in the document FR2861060.

A node 5 includes a fold 7 that extends the top edge surface 8 (see FIG. 3) of the high corrugation 3 forming said node. The top edge surface 8 of the high corrugation 3 includes a pair of concave corrugations 9 (shown in more detail in FIG. 3) the concave side of which faces toward the interior of the tank and that are disposed on either side of the fold 7.

Other possible features and details of the sealing membrane 1, the corrugated metal plates forming said sealing membrane 1 and the structure of the nodes 5 are described in the document WO2017017337 or WO 2017006044. For example, the sealing membrane 1 may be made of stainless steel or aluminium sheet and have a thickness of approximately 1.2 mm and may be shaped by drawing or bending. Other metals or alloys and other thicknesses are possible.

Figure 2:
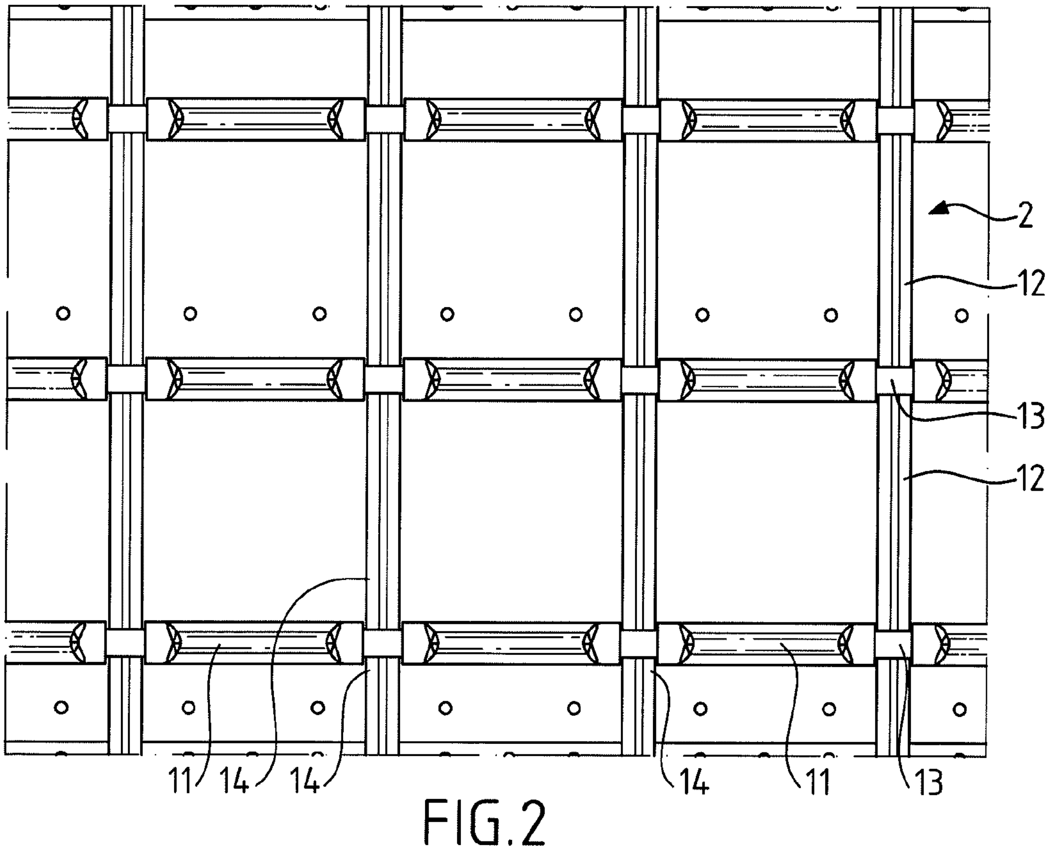
FIG. 2 is a top view of a thermally insulative barrier of the fluid-tight and thermally insulative tank wall from FIG. 1 in which the sealing membrane is not shown.

As shown in FIGS. 1 and 2, rows of first wave reinforcements 11 are arranged under the high undulations 3. Similarly, rows of second wave reinforcements 12 are arranged under the low corrugations 4. These wave reinforcements 11, 12 make it possible to support and to reinforce the corrugations 3, 4 of the sealing membrane in the presence of stresses linked for example to movement of the fluid in the tank. Wave reinforcements 11, 12 of this kind may be produced in numerous materials such as for example metals, notably aluminium, metal alloys, plastic materials, notably polyethylene, polycarbonate, polyether imide, or composite materials containing fibres, notably glass fibres, connected by a plastic resin.

The first wave reinforcements 11 are arranged under each longitudinal portion 6 of the high corrugations 3. Similarly, the second wave reinforcements 12 are arranged under each longitudinal portion 6 of the low corrugations 4.

However, the stresses in the tank are not always uniform. Thus a high corrugation 3 may be subjected over its length to asymmetrical stresses. Such asymmetrical stresses are reflected in the application of a lateral stress to a longitudinal portion 6 of the high corrugation 3 without the adjacent longitudinal portion 6 of said high corrugation 3 being subjected to any analogous stress. In the presence of asymmetrical stresses of this kind, the high corrugation 3 may be subject to a high torsion at the level of the node 5 separating the two successive longitudinal portions 6 subject to said asymmetrical stress.

To prevent this, as explained in more detail hereinafter with reference to FIGS. 3 to 5, the first wave reinforcements 11 arranged under the same high corrugation 3 are assembled by a connecting member 13. Connecting members 13 of this kind are arranged under the high corrugation 3 at the level of each node 5 to associate two successive first wave reinforcements 11 in said high corrugation 3.

Connecting members 13 of this kind enable stable alignment of two successive first wave reinforcements 11. Thus each high corrugation 3 is supported by a row of first wave reinforcements 11 associated two by two along said high corrugation 3 in an alignment corresponding to the longitudinal direction of said high corrugation 3. Thus if a high corrugation 3 is subjected to an asymmetrical stress the connecting member 13 enables the alignment of the successive first wave reinforcements 11 to be preserved and therefore makes it possible to avoid torsion of the sealing membrane 1 at the level of the node 5. In particular, the first wave reinforcement 11 arranged under the longitudinal portion 6 subjected to a stress transmits part of the force to the first wave reinforcements 11 to which it is connected via the connecting members 13, thus enabling distribution of said force over the adjacent first wave reinforcements 11. In other words, the connecting members 13 enable the row of first wave reinforcements 11 to function in a substantially analogous manner in the presence of asymmetrical stresses and symmetrical stresses along the high corrugation 3 under which said row of first wave reinforcements 11 is arranged. Thus the high corrugations 3 are reinforced in a uniform manner over all their length and the risks of high torsion in the event of asymmetrical stresses are reduced or even eliminated.

As shown in FIG. 2, the distance separating two successive first wave reinforcements 11 is greater than the width of the second wave reinforcements 12. Moreover, the second wave reinforcements 12 are developed in the longitudinal portions 6 of the low corrugations 4 until they come into contact with the connection members 13 accommodated in the nodes 5 formed at the ends of said longitudinal portions 6. Thus ends 14 of each second wave reinforcement 12 are arranged between two adjacent first wave reinforcements 11. Thus the second wave reinforcements 12 are immobilized at the level of the nodes on the one hand laterally by the first wave reinforcements 11 and on the other hand longitudinally by the connecting members 13 accommodated in said nodes.

The first wave reinforcements 11 are described hereinafter with reference to FIGS. 3 and 4. A first wave reinforcement 11 includes a sole 15 and a reinforcement portion 16.

The sole 15 has a lower wall 17, two lateral walls 18 and an upper wall 19. The lower wall 17 is plane and rests on the thermal insulation barrier 2. The upper wall 19 is plane and parallel to the lower wall 17. The lateral walls connect the lower wall 17 and the upper wall 19 over all the length of the first wave reinforcement 11. The lower wall 17, the lateral wall 18 and the upper wall 19 conjointly delimit a hollow internal space of the sole 15.

Figure 4:
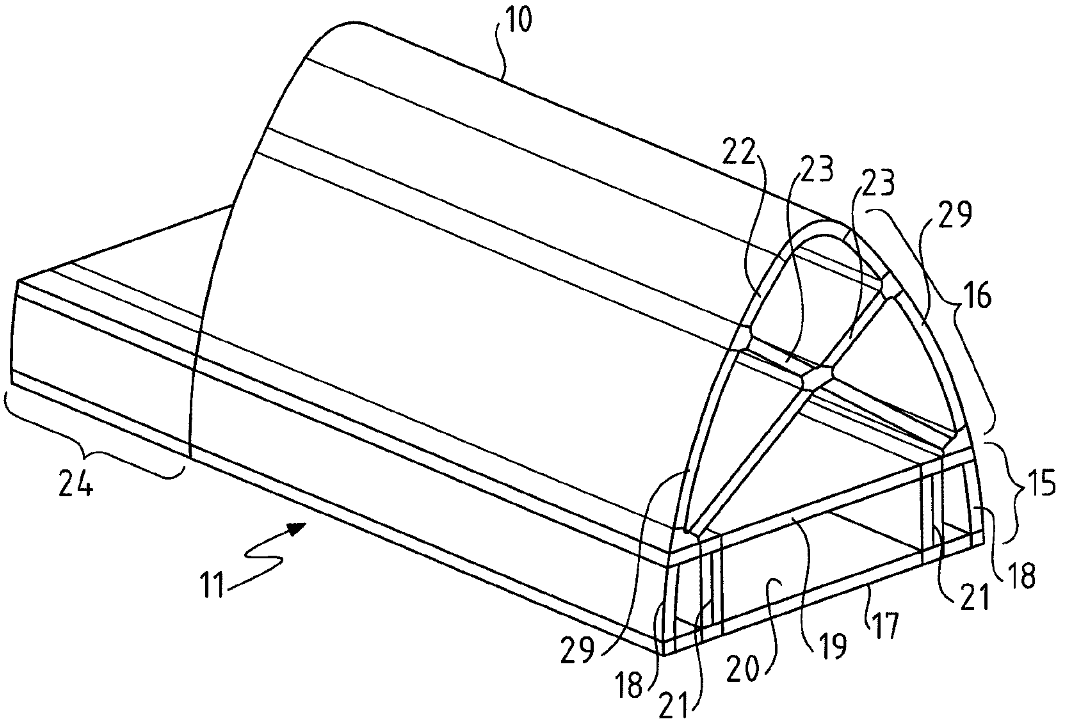
FIG. 4 is a cutaway partial perspective view of a wave reinforcement according to a first embodiment.

As shown in FIG. 4, the sole 15 preferably includes reinforcement walls 21 in the hollow space connecting the lower wall 17 and the upper wall 19. These reinforcement walls 21 reinforce the sole 15 and in particular enable the sole 15 to retain its shape even under heavy stresses.

The reinforcement portion 16 of the first wave reinforcement 11 includes an external wall 22. This external wall 22 preferably has a shape complementary to the shape of the high corrugation 3. Thus, as shown in FIG. 4, the external wall 22 has a domed shape.

The reinforcement portion 16 is preferably hollow in order to enable the circulation of inerting gas or leak detection gas in the thermal insulation barrier 2. Thus the upper wall 19 of the sole 15 and the external wall 22 together delimit a hollow internal space of the reinforcement portion 16.

The reinforcement portion 16 advantageously includes internal webs 23 in order to reinforce said reinforcement portion 16. In FIG. 4 these internal webs 23 cross substantially at the centre of the reinforcement portion 16.

The sole 15 has a length greater than the length of the reinforcement portion 16. Thus, as shown in FIG. 4, the sole 15 features a projecting portion 24 that projects longitudinally beyond the reinforcement portion 16.

The first wave reinforcement 11 may be fabricated in many ways. The first reinforcement portion 11 is preferably produced initially with a constant section by extrusion of all the length of said first wave reinforcement 11. Thereafter, the reinforcement portion 16 is machined to produce the projecting portion 24 of the sole 15. The reinforcement portion 16 is preferably machined with a bevel at the level of its junction with the projecting portion 24, the reinforcement portion therefore having a maximum length at the level of its junction with the sole 15.

Figure 3:
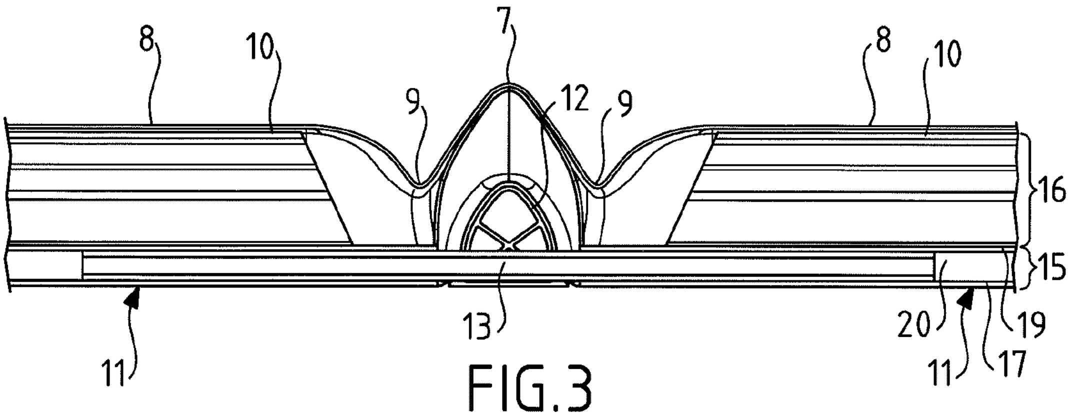
FIG. 3 is a sectional view of a corrugation of the fluid-tight membrane from FIG. 1 in which are accommodated wave reinforcements connected by a connecting member at the level of a node of the sealing membrane.

FIG. 3 shows two first wave reinforcements 11 at the level of a node 5 assembled by the connecting member 13. As explained above, the high corrugation 3 features at the level of the node 5 two concave portions 9 separated by a fold 7. These concave corrugations 9 form a reduction of the height of the high corrugation 3 at the level of the node 5. The top edge surface 8 of the high corrugation 3 therefore has a uniform section as far as the reduction in size formed by the concave corrugations 9 at the level of the node 5.

The length of the reinforcement portion 16 at the summit of the external wall 22 is for example equal to the length of the longitudinal portion 6 of the high corrugation 3 which has a uniform section between two nodes 5. This uniform section portion stops where the high corrugation 3 has a small lateral constriction marking the start of the node 5, the geometry of which is complex as explained above. Moreover, the bevel shape of the reinforcement portions 16 substantially corresponds to the inclination of this lateral constriction, and so the reinforcement portion 16 approaches the node 5 as closely as possible for optimum support of the corrugation.

Moreover, but not shown, the edge surface of the external wall 22 is also bevelled. Thus the edge surface of the external wall has a face inclined relative to the longitudinal axis of the reinforcement portion 16. This bevelled edge surface has a bevelled face facing toward the high corrugation 3. Thus if the first wave reinforcement 11 is moved in the longitudinal direction in the high corrugation in which it is accommodated, the contact between the reinforcement portion 16 and the high corrugation 3 occurs at the level of the bevelled edge surface the face of which espouses the shape of the high corrugation. This contact therefore occurs with no risk of degrading the high corrugation through cooperation between the bevelled edge surface and the high corrugation 3, there being no risk of the edge surface of the external wall 22 degrading the high corrugation 3.

The sole 15 has a width less than the width of the lateral constriction marking the beginning of the node 5. In other words, the distance separating the lateral walls 18 of the sole 15 is less than the width of the high corrugation 3 at the level of the lateral constriction marking the beginning of the node 5. Thus the projecting portion 24 of the sole 15 can be inserted in the node 5 as shown in FIG. 3.

The projecting portion 24 of the first wave reinforcement 11 advantageously projects longitudinally in the node 5 in the direction of the fold 7 beyond the minimum height reduction of the high corrugation 3 formed by the concave portion 9. However, the distance separating the projecting portions 24 of two successive first wave reinforcements 11 is greater than the width of the adjacent second wave reinforcement 12 accommodated in the low corrugation 4 forming the node 5. In other words, the projecting portions 24 of the first wave reinforcements 11 are stopped prior to the low corrugation 4 so as not to be in line with said low corrugation 4. Thus as shown in FIG. 2 the second wave reinforcements 12 may be developed in such a manner as to be inserted in the node 5 inserted between the soles 15 of the two first wave reinforcements 11. Thus said second wave reinforcements 12 can be retained in position by cooperation with the soles 15 of said first wave reinforcements 11.

The connecting member 13 is accommodated in the soles 15 of the two successive first wave reinforcements 11 in such a manner as to assemble said successive first wave reinforcements 11.

Figure 5:
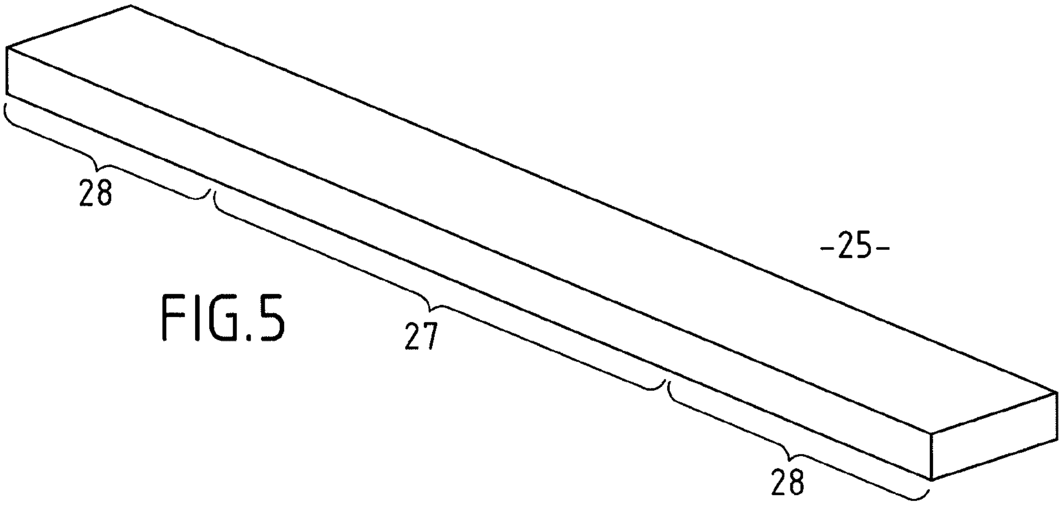
FIG. 5 is a cutaway partial perspective view of a connecting member according to a first embodiment.

FIG. 5 shows an example of connecting member as inserted in the soles 15 of the two successive first wave reinforcements 11 shown in FIG. 3. A connecting member of this kind takes the form of a parallelepiped-shaped sleeve 25 the width of which is less than the distance separating the reinforcement walls 21 of the soles 15. More particularly, the sleeve 25 has a section the dimensions of which are slightly less than the dimensions of a housing 20 (see FIG. 4) delimited by the lower wall 17, the upper wall 19 and the reinforcement walls 21 of the soles 15.

The complementary shapes of the connecting member 13 and the housing 20 of two successive first wave reinforcements 11 enables the insertion of the connecting member 13 into the housings 20 with good cooperation between the connecting member 13 and the soles of said first wave reinforcements 11, thus ensuring good maintenance of the alignment of said first wave reinforcements 11.

For example, the connecting member 13 may be inserted in each housing 20 to a distance of 2 to 3 cm, or again, and preferably, a distance greater than 5 cm, notably 5 to 8 cm, in order to cooperate with the first wave reinforcements 11 over a length sufficient for stable maintenance of the alignment of said first wave reinforcements 11.

As shown in FIG. 2, the second wave reinforcements 12 are inserted in the nodes 5 in such a manner as to have a minimal clearance or even to be in contact with the connecting members 13. Thus the second wave reinforcements 12 can immobilize in translation the connecting member 13 with which they cooperate.

A connecting member 13 in the form of a sleeve 25 can advantageously be slid into the sole 15, enabling manufacturing tolerances to be ignored, and to ensure by such more or less insertion of the sleeve 25 in the soles 15 to make good any manufacturing play. Thus the sleeve 25 of this kind has a central portion 27 and two ends 28 separated by said central portion 27. The central portion 27 corresponds to the distance separating the two soles 15 and the ends 28 are the portions of said sleeve 25 inserted in the soles 15. The relative sliding between the connecting member 13 and the first wave reinforcements 11 also makes it possible to absorb thermal contraction of the wave reinforcements without producing stresses.

A sleeve 25 of this kind may be produced in numerous ways and may be solid or hollow.

Figure 6:
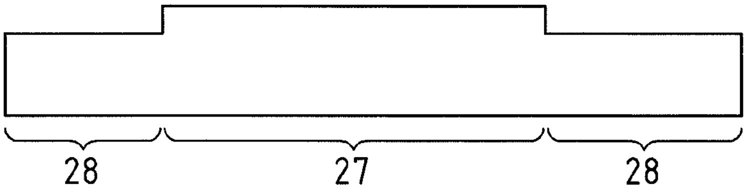
FIG. 6 is a sectional view of a variant embodiment of the connecting member from FIG. 5.

FIG. 6 shows a variant embodiment of the sleeve 25 shown in FIG. 5. In this variant embodiment, the connecting member 13 has a central portion 27 separating two longitudinal ends 28. The central portion 27 forms an overthickness relative to the ends 28. In a similar manner to the plate 25, the ends 28 have a section of complementary shape to the shape of the housings 20 of the first wave reinforcements 11. Thus each end 28 of a connecting member 13 of this kind is inserted in a respective housing 20 until the sole 15 including said housing 20 comes to abut against the central portion 27. In other words, the central portion 27 forms two abutment surfaces limiting the insertion of the connecting member 13 into the housings 20 of the soles 15 in which the ends 28 of said connecting member 13 are inserted.

The abutment surfaces making it possible to limit the insertion of the connecting member 13 into the soles 15 could be produced in numerous ways. In an embodiment not shown, attached parts are fixed to an upper face of the plate 25 in order to form said abutment surfaces. Thus for example screws may be fixed to but not pass through the plate 25 in order to cause said plate 25 to project, the insertion of the plate 25 into the housings 20 being limited by abutment of the upper wall 19 of the soles on these screws. In another embodiment not shown rivets could fulfil the same function, such rivets preferably projecting only from the upper surface of the plate 25. In another embodiment not shown but derived from FIG. 10, the part 33 may be widened so that its edges facing the first wave reinforcements 11 serve as abutments for said first wave reinforcements 11 in addition to providing the connection with the lugs 34.

Figure 7:
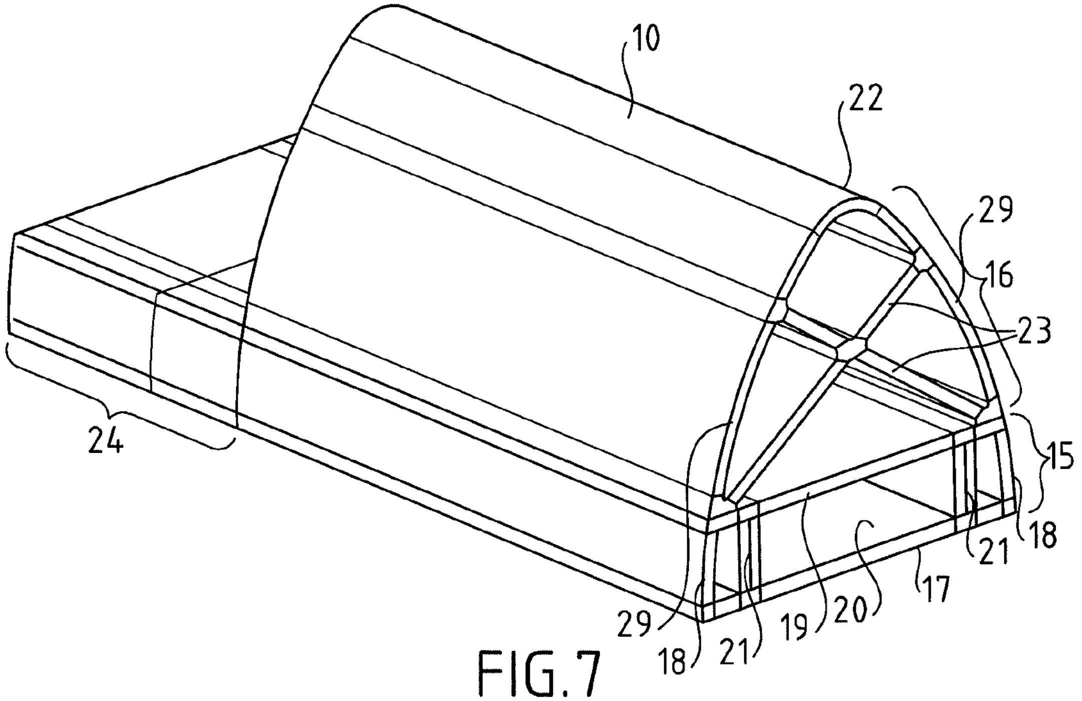
FIG. 7 is a sectional partial perspective view of a wave reinforcement according to a second embodiment.
Figure 8:
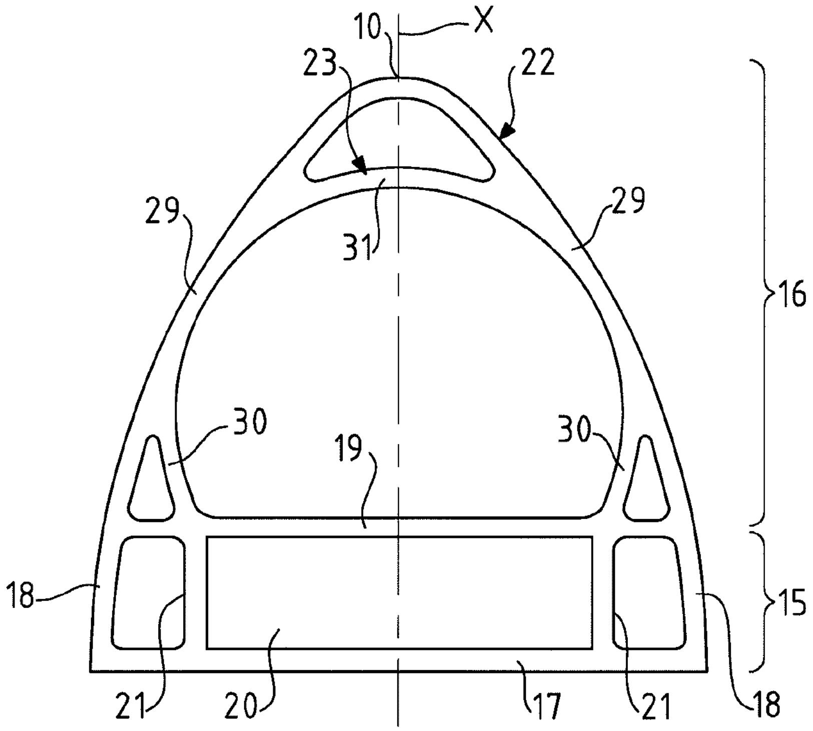
FIGS. 8 and 9 are sectional views of variant embodiments of the wave reinforcement from FIG. 4 or 7.
Figure 9:
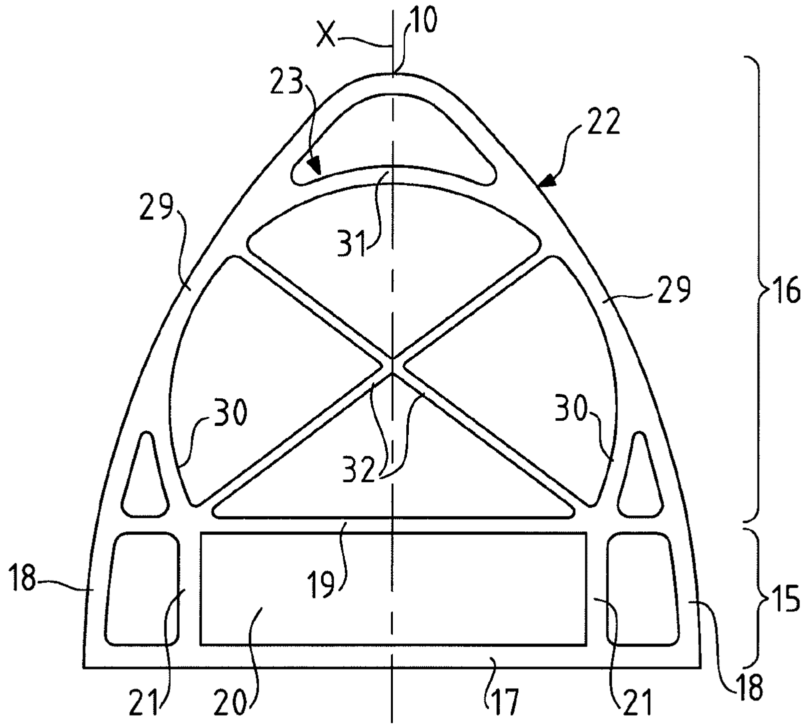

FIGS. 7 to 9 show variant embodiments of the first wave reinforcement 11. Elements identical to or fulfilling the same function as the elements described above with reference to FIGS. 1 to 6 bear the same reference. The variants of the first wave reinforcements 11 are also applicable to the second wave reinforcements 12.

FIG. 7 shows a first variant of the first wave reinforcement 11 shown in FIG. 4. This variant is distinguished from that shown in FIG. 4 in that the end of the reinforcement portion 16 from which the projecting portion 24 projects is straight, that is to say not bevelled, and so the reinforcement portion has a constant length.

FIG. 8 shows a second variant of the first wave reinforcement 11. In FIG. 8, the first wave reinforcement 11 includes a sole 15 and a reinforcement portion 16.

The sole 15 includes a lower wall 17, two lateral walls 18 and an upper wall 19. The lower wall 17, the lateral walls 18 and the upper wall 19 conjointly define a hollow passage in the sole 15. The sole 15 further includes in said hollow passage reinforcing walls 21 connecting the lower wall 17 and the upper wall 19.

The reinforcement portion includes an external wall 22. This external wall has a shape complementary to the shape of the high corrugation 3 under which the first wave reinforcement is intended to be accommodated. The external wall 22 typically has two lateral walls 29 each forming a lateral face of the reinforcement portion 16. Each lateral wall 29 is developed from the sole 15, more particularly from an upper end of a respective lateral wall 18 of the sole 15, extending as far as a summit of the reinforcement portion 16. The external wall delimits with the upper wall 19 of the sole 15 a hollow passage in the reinforcement portion 16.

The reinforcement portion further includes an internal web 23. This internal web in the variant shown in FIG. 8 has a circular shape truncated by the upper wall 19 of the sole 15. This internal web 23 of truncated circular shape is tangential to the lateral walls 29 of the external wall 22. More particularly, two first curved portions 30 of the internal web 23 each connect the upper wall 19 of the sole 15 to an internal face of a respective lateral wall 29. A second curved portion 31 connects the two lateral faces 29 of the external wall 22.

The junction between each first curved portion 30 and the upper wall 19 of the sole 15 is preferably made on an upper face of said upper wall 19 in line with the junction between a lower face of said upper wall 19 and a respective reinforcing web 21 of the sole 15.

In a variant shown in FIG. 9, the reinforcement portion 16 further includes intersecting reinforcement webs 32. These intersecting reinforcement webs 32 connect a lateral face 29 of the respective external wall 22 and the upper wall 19 of the sole. These intersecting reinforcement webs 32 cross at the level of a plane of symmetry X of the first wave reinforcement developed in a longitudinal direction of the first wave reinforcement 11 perpendicular to the upper wall 19 of the sole 15 and passing through the summit 10 of the reinforcement portion 16. A reinforcement web 32 developing from one of the lateral walls 29 is preferably joined to the upper wall 19 of the sole 15 at the level of the junction between the first curved portion 30 connecting the other lateral wall 29 and the upper wall 19 of the sole 15.

In a variant not shown the reinforcement webs 32 of the first wave reinforcement 11 as shown in FIG. 9 are replaced by a reinforcement web parallel to the upper wall 19. A reinforcement web of this kind is for example joined to the internal face of the lateral wall 29 formed by the external wall 22 at the level of the tangential junction between the internal web 23 of truncated circular shape and said internal face walls of the lateral wall 29.

Figure 10:
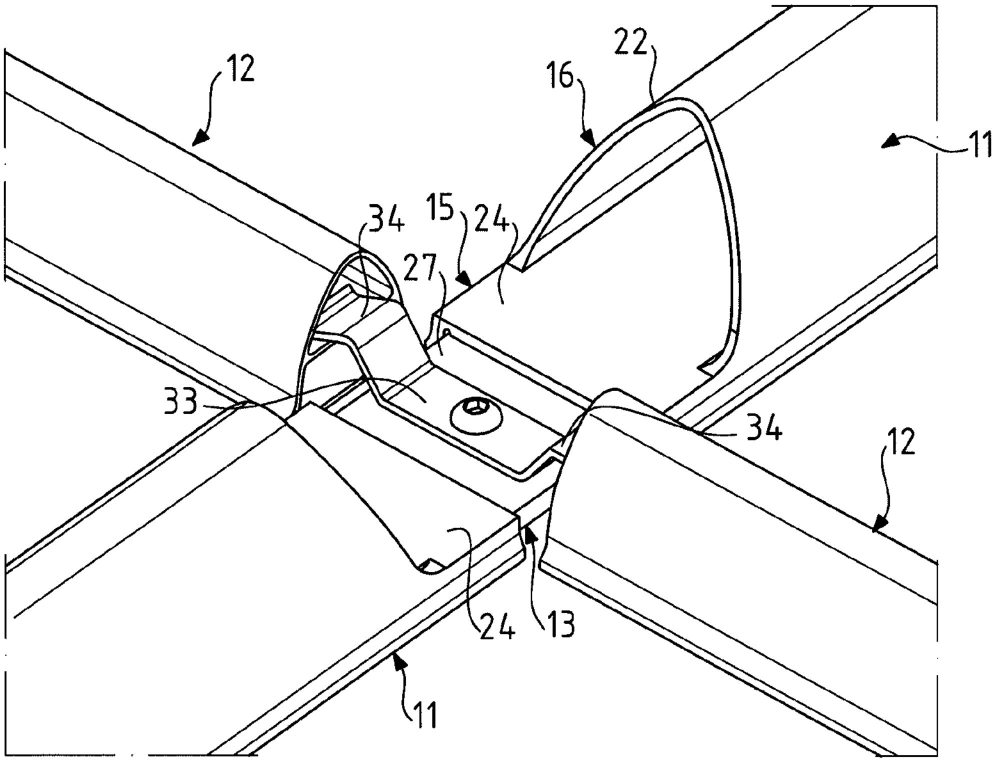
FIGS. 10 and 11 are diagrammatic perspective view of wave reinforcements connected at the level of a node by connecting members according to variants of FIG. 5.
Figure 11:
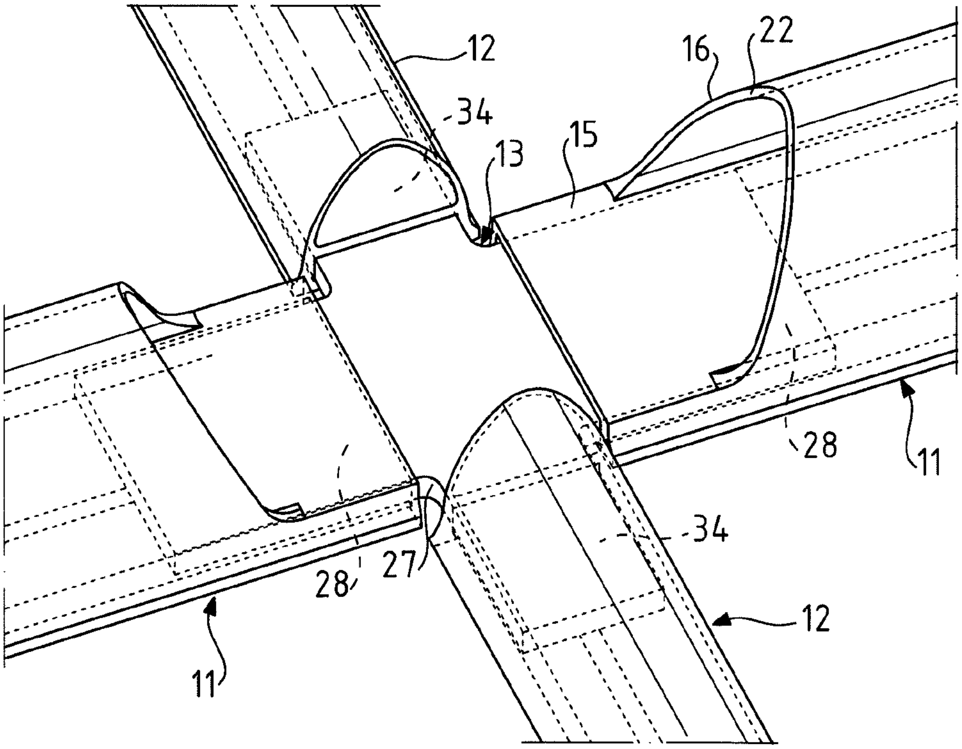

FIGS. 10 and 11 are diagrammatic perspective views of wave reinforcements connected at the level of a node by connecting members in accordance with variant embodiments of FIG. 5. Elements identical to or fulfilling the same function as elements described above bear the same references.

The connecting member 13 shown in FIG. 10 includes a sleeve 25 as described with reference to FIG. 5. Thus this sleeve 25 includes a central portion 27 separating two ends 28 of said plate 24 accommodated in the soles 15 of two successive first wave reinforcements 11.

In this variant, a plate 33 is fixed to the central portion 27 of the sleeve 25. This plate 33 is fixed in a manner such that it does not pass through the sleeve 25 in order not to cause the sleeve 25 to project in the direction of the thermal insulation barrier 2.

The plate 33 carries two lugs 34 each of which projects laterally from the sleeve 25. Each of the lugs 34 is accommodated in the hollow portion of a second wave reinforcement 12.

Each lug 34 is preferably elastic. In the embodiment shown in FIG. 10, these elastic lugs 34 are formed by a bent end of the plate 33. The elastic lugs 34 are conformed to exert on the second wave reinforcements 12 into which they are inserted a retaining force in the direction of the thermally insulating barrier 2. Thus these elastic lugs 34 advantageously enable retention in position on the thermal insulation barrier 2 of the second wave reinforcements 12 in which they are inserted.

In the embodiment shown in FIG. 10, the first wave reinforcements 11 and the second wave reinforcements each have a sole 15 and a reinforcement portion 16. However, the soles 15 of the second wave reinforcements 12 do not include any projecting portion 24, unlike the first wave reinforcements 11.

To make FIGS. 10 and 11 easier to read, the reinforcement walls 21 and the internal webs 23 of the wave reinforcements 11, 12 are not shown, the wave reinforcements 11, 12 shown in these FIGS. 10 and 11 including or not including reinforcement walls 21 and/or internal webs 23 as described above.

The second wave reinforcements fastened to the connecting member may be retained in numerous other ways. In an embodiment not shown the second wave reinforcements 12 include internal reinforcement webs as in FIG. 3 and the lugs 34 have an end clipped to said internal webs of the second wave reinforcements 12. In another embodiment not shown the hollow portion of the second wave reinforcements features a tab onto which the end of the lug 34 is clipped.

The embodiment shown in FIG. 11 is distinguished from that shown in FIG. 10 in that the lugs 34 are integral with the sleeve 25. The connecting member 13 typically has the shape of a cross including four lugs, two opposite lugs 28 being accommodated in the sole 15 of the first wave reinforcements 11 and two opposite lugs 34 being accommodated in the soles 15 of the second wave reinforcements 12. In other words, the connecting member 13 shown in FIG. 11 is similar to a solid or hollow sleeve 25 the central portion 27 of which is developed laterally to form the lugs 34 accommodated in the soles 15 of the second wave reinforcements 12. For example, the lugs 34 of the connecting member 13 may be inserted in the soles 15 of the second wave reinforcements 12 to a distance of 2 to 3 cm, or again, and preferably, to a distance greater than 4 cm, notably from 4 to 6 cm, in order to cooperate with the second wave reinforcements 12 over a length sufficient for stable preservation of the alignment of said second wave reinforcements 12.

Figure 12:
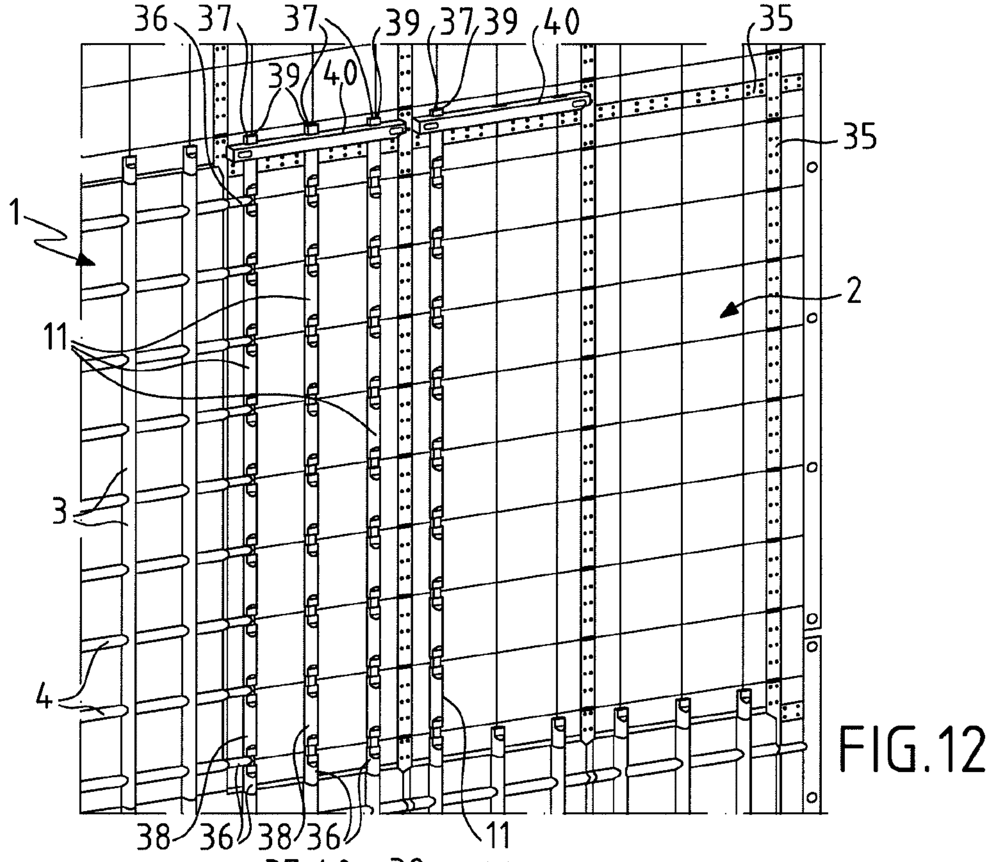
FIGS. 12 to 14 are diagrammatic perspective views of a fluid-tight and thermally insulative tank wall during assembly showing steps of mounting the wave reinforcements and the sealing membrane on the thermally insulative barrier.
Figure 13:
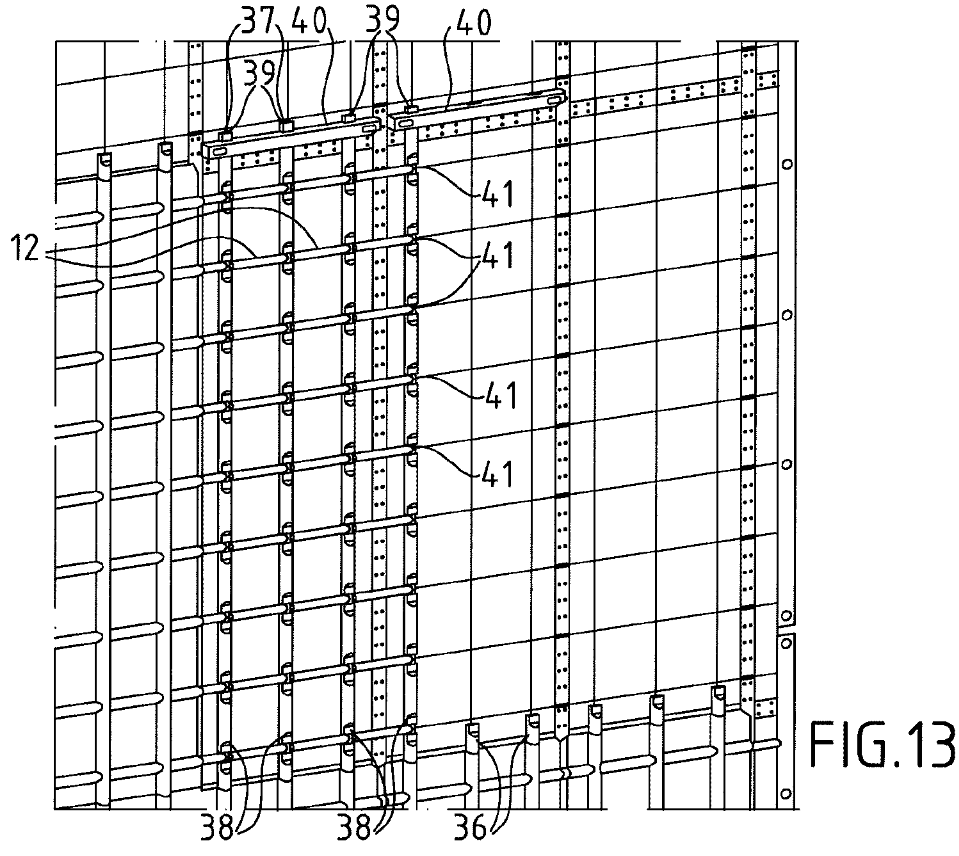
Figure 14:
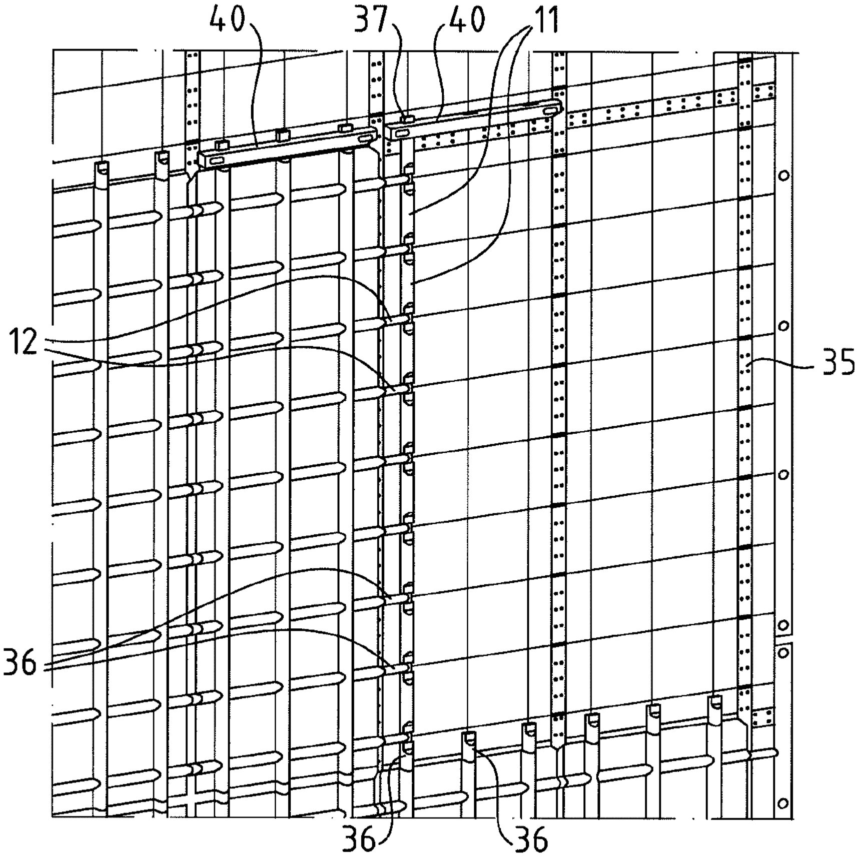

FIGS. 12 to 14 are diagrammatic perspective views of a fluid-tight and thermally insulative tank during assembly showing steps of assembling wave reinforcements and the sealing membrane to the thermally insulative barrier.

During the assembly of the tank, rows of wave reinforcements 11, 12 are installed and retained in position on the thermal insulation barrier 2 before being covered by corrugated metal plates. These corrugated metal plates are of rectangular shape and carry high corrugations 3 and low corrugations 4. The edges of said corrugated metal plates intersect the high corrugations 3 and the low corrugations 4 between two successive nodes of said corrugations 3, 4. Thus wave reinforcements 11, 12 positioned under corrugations 3, 4 at the level of the edges of corrugated metal plates are conjointly covered by two successive corrugated metal plates.

In FIG. 12 there is partly shown a sealing membrane 1 during assembly. In this FIG. 12, some metal plates of the sealing membrane 1 have already been anchored onto metal inserts 35 of the thermal insulation barrier 2. Thus portions 36 of the wave reinforcements 11, 12 accommodated under the corrugations 3, 4 of metal plates already installed are in part not covered by said metal plates already installed.

Initially, as shown in FIG. 12, rows 37 of first wave reinforcements 11 are positioned on the thermal insulation barrier 2. These rows 37 include a plurality of first wave reinforcements 11 assembled together by connecting members in such a manner as to form a garland of first wave reinforcements 11.

A first end 38 of these rows 37 of first wave reinforcements is moreover assembled by means of a connecting member 13 to the first wave reinforcements 11 partly covered by the metal plate already anchored to the insulating barrier. Thus this first end 38 of the rows 37 is retained in position on the thermal insulation barrier 2 by said metal plate already anchored to the thermal insulation barrier 2.

A second end 39 of these rows 37 of first wave reinforcements 11 opposite the first end 38 is retained in position on the thermal insulating barrier 2 by means of a fixing rail 40. This fixing rail 40 is temporarily fixed to the thermal insulation barrier 2 by any appropriate means, for example by means of screws, nails, etc. This fixing rail 40 is for example temporarily fixed to the metal inserts 35, said metal inserts including for example a threaded orifice enabling cooperation with the fixing screw of the metal layer 40. In another embodiment, the fixing rail 40 may be temporarily anchored to pins serving to anchor the thermal insulating barrier 2 or by means of a fixing lug sliding in the space between two insulating panels forming the thermal insulation barrier 2. This fixing rail 40 covers the first end 39 of each row 37 in order to retain in position on the thermal insulation barrier 2 said second end 39 of these rows 37.

The connecting members 13 and fixing the ends 38, 39 of the rows 37 of the first wave reinforcements 11 thus enable retention in position of said rows 37 on the thermal insulation barrier 2.

Secondly, as shown in FIG. 13, rows 41 of second wave reinforcements 12 are positioned on the thermal insulation barrier 2. These second wave reinforcements 12 are retained in position on the thermal insulation barrier 2 by any appropriate means, for example with the aid of the lugs 34 of the connecting members 13 described above, by double-sided adhesive tape, etc.

In the embodiment shown in FIGS. 12 to 14, each corrugated metal plate includes three high corrugation 3 portions. Moreover, the second wave reinforcements 12 are retained in position on the thermal insulation barrier 2 by the lugs 34 of the connecting members 13 connecting together the first wave reinforcements 11. Consequently, four rows 37 of first wave reinforcements are installed on the thermal barrier 2, the fourth row 37 enabling fixing of the end second wave reinforcements 12 of the rows 41 prior to installation of the corrugated metal plate intended to cover them.

Thirdly, and finally, as shown in FIG. 14, the corrugated metal plate of the sealing barrier is anchored to the thermal insulation barrier 2 by welding it onto the metal inserts 35, thus covering the rows 37, 41 of wave reinforcements 11, 12 and ensuring they are fixed to the thermal insulation barrier 2. The fixing rail 38 can then be removed and the installation of the wave reinforcements 11, 12 and the metal plates continued by repeating the steps described above.

Figure 15:
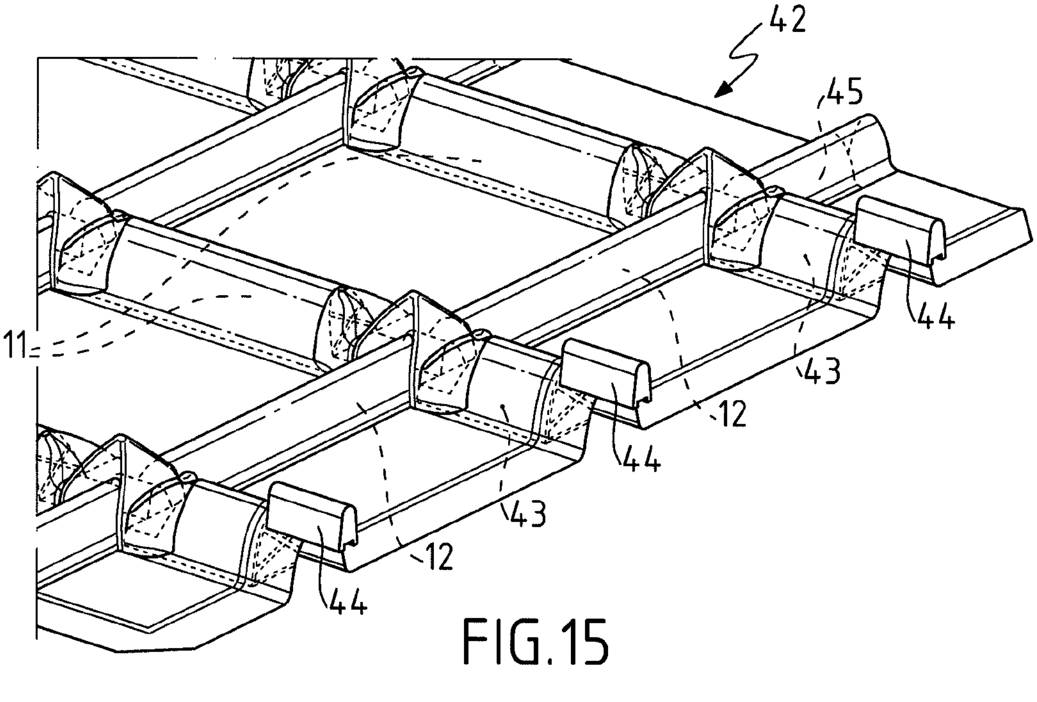
FIG. 15 is a diagrammatic perspective view of a fluid-tight membrane element in accordance with a variant assembly of the sealing membrane onto the thermally insulative barrier.

FIG. 15 shows a variant embodiment of the method of assembling the sealing membrane. In this variant, the wave reinforcements are not fixed temporarily to the thermal insulation barrier 2 but instead to the metal plates. Thus first wave reinforcements 11 are installed in the high corrugations 3 of the corrugated metal plate 42. These first wave reinforcements 11 are then assembled by connecting members 13.

As explained above, the edges of the corrugated metal plate 42 of this kind interrupt the high corrugations 3 between two nodes 5. Consequently, first wave half-reinforcements 43 are arranged at the level of the high corrugations 3 interrupted by the edges of the metal plate 42. In order to retain the first wave reinforcements 11, 43 in the high corrugation 3 of the metal plate 42, retaining clips 44 are arranged on the edges of said metal plate 42. These retaining clips 44 include a portion arranged on the internal face of the metal plate 42 and a portion accommodated in the reinforcement portion 16 of the first wave half-reinforcement 43, as shown in FIG. 15.

In a similar manner to the first wave reinforcements 11, 43, the second wave reinforcements 12 are installed in the low corrugations 4 of the metal plate 42 and second wave half-reinforcements 45 are installed on the low corrugation portions interrupted at the level of the edges of the metal plate 42. The second wave reinforcements 12 and these second wave half-reinforcements 45 are retained in the low corrugations 4 by cooperation with the connecting members 13 between the first wave reinforcements 11 and retaining clips (not shown) similar to the retaining clips 44.

Thus the wave reinforcements 11, 12, 43, 45 are retained in position in the metal plate 42 and form a unitary assembly. This assembly is positioned on the thermal insulation barrier 2 and then, after positioning it, the retaining clips are removed to enable the fixing by welding of the metal plates 42 to the metal inserts 35 of the thermal insulation barrier.

Figure 17:
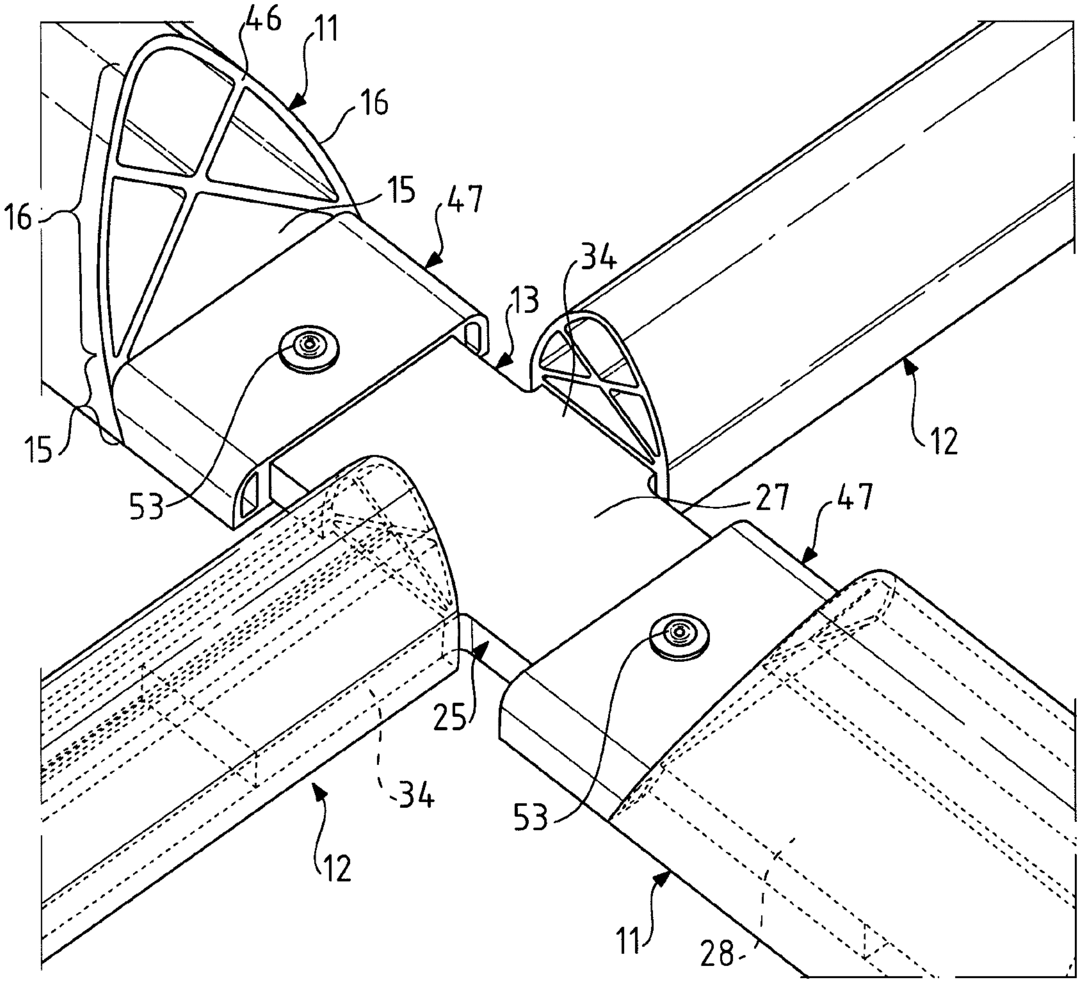
FIG. 17 is a diagrammatic perspective view of wave reinforcements connected at the level of a node by a connecting member in accordance with a variant of FIG. 11.
Figure 18:
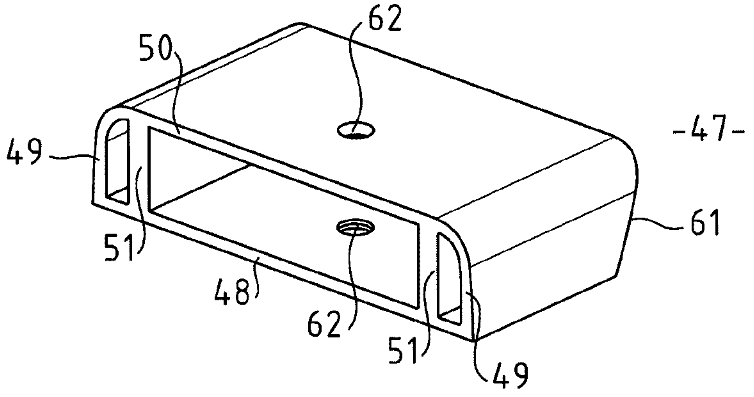
FIG. 18 is a diagrammatic perspective view of the attached spacer from FIG. 17.
Figure 19:
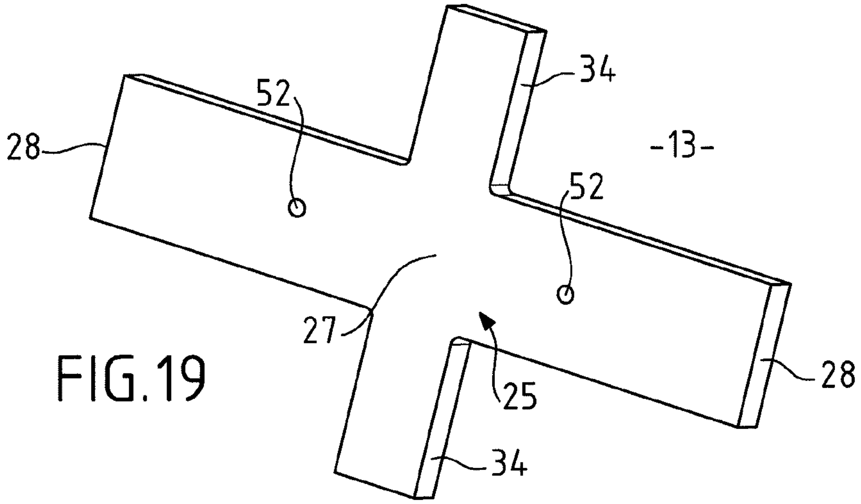
FIG. 19 is a diagrammatic perspective view of the connecting member from FIG. 17.

FIGS. 17 to 19 show wave reinforcements connected at the level of a node by a connecting member in accordance with a variant embodiment. In these FIGS. 17 to 19, elements identical to or fulfilling the same functions as elements described above bear the same reference numbers.

This variant embodiment is distinguished from the variants described above in that the first wave reinforcements 11 accommodated under the longitudinal portions 6 of the high corrugations 3 do not have any projecting portion 24. Thus the sole 15 and the reinforcement portion 16 of the first wave reinforcements 11 conjointly form an end face 46 of the wave reinforcement 11. This end face 46 faces the node 5 in which the connecting member 13 is accommodated, the node 5 not being shown in FIG. 17 for reasons of legibility.

In a manner analogous to the embodiment described above with reference to FIG. 3, the end face 46 is bevelled. Thus the sole 15 and the reinforcement portion 16 are bevelled so that the end face 46 is situated in an inclined plane substantially corresponding to the inclination of the lateral constriction at the level of the node 5. Thus this end face 46 approaches as closely as possible the node 5 for optimum support of the high corrugation 3. First wave reinforcements 11 of this kind are simple to fabricate and do not necessitate any particular machining of the reinforcement portion 16 to produce the projecting portion 24.

In this embodiment the projecting portion 24 is replaced by an attached spacer 47. This attached spacer 47 enables the bottom part of the high corrugation 3 to be supported like the projecting portion 24 described above. To this end, the attached spacer 47 has for example a structure analogous to the projecting portion 24, that is to say a structure analogous to the structure of the sole 15.

Thus as shown in FIG. 18 the attached spacer 47 is hollow and has a lower wall 48, two lateral walls 49, an upper wall 50 and reinforcement walls 51. The attached spacer 47 has a face 61 complementary to the end face 46 of the wave reinforcement 11, that is to say bevelled with a bevel opposite the bevel of the face 46. The various walls 48, 49, 50, 51 of the attached spacer 47 extend the corresponding walls 18, 19, 20, 21 of the sole 15 into the node 5. In other words, the attached spacer 47 extends the sole 15 of the first wave reinforcement 11 and is accommodated in the node 5 in an analogous manner to a projecting portion 24 as described above.

In an analogous manner to the connecting member 13 described above with reference to FIG. 11, the connecting member 13 as shown in FIG. 19 has a cruciform shape. Thus the connecting member includes a sleeve 25 forming two opposite first lugs 28. As shown in FIG. 17 these first lugs 28 pass through the attached spacers 47 and are accommodated in the soles 15 of the first wave reinforcements 11 joined at the level of the node 5. Second lugs 34 enable retention of the second wave reinforcements 12. The second lugs 34 are integral with the sleeve 25 and project laterally from said sleeve 25 in such a manner as to be accommodated in the soles 15 of said second wave reinforcements 12 at the level of the node 5 as shown in FIG. 17.

The first lugs 28 of the connecting member 13 shown in FIG. 19 include an orifice 52. Similarly, the attached spacer 47 as shown in FIG. 18 includes two orifices 62. These orifices 52 and 62 enable fixing of the attached spacer 47 to the connecting member 13. The attached spacers 47 may be fixed in numerous ways. In the example shown in FIGS. 17 to 19, the attached spacers 47 are fixed to the connecting member 13 by riveting them thereto by means of rivets 53. In an embodiment not shown the attached spacers 47 are fixed to the connecting member 13 by screwing, welding or any other appropriate means.

The attached spacers 47 enable limitation of the sliding of the first wave reinforcements 11 under the high corrugations 3. In particular these attached spacers immobilize the first wave reinforcements 44 in the direction of the node 5, thus preventing the end faces 46 of said first wave reinforcements 11 from coming into contact with the sealing membrane 1 at the level of the node 5. This absence of contact enables degradation of the sealing membrane 1 at the level of the nodes 5 to be prevented.

Furthermore, attached spacers 47 of this kind fulfil the role of abutments for immobilizing in position the first wave reinforcements 11 and guarantee correct positioning of said first wave reinforcements 11 on the thermally insulative barrier 2 during assembly of the sealing membrane 1 onto the thermally insulating barrier 2. This abutment function is particularly useful in the case of tank walls featuring a vertical component, preventing the first wave reinforcements 11 from being moved by the effect of gravity.

The attached spacers 47 may be fixed to the connecting member 13 as a preliminary manufacturing step. Thus connecting members 13 to which the attached spacers 47 have previously been fixed are positioned on the thermally insulative barrier 2 and the first wave reinforcements 11 are positioned on said thermally insulative barrier 2 by inserting into the sole 15 of said first wave reinforcements 11 the lug portions 28 projecting from the attached spacer 47.

In the context of a sealing membrane assembly as described above with reference to FIGS. 12 to 14, the first wave reinforcements 11 intended to reinforce the high corrugations 3 of the final metal plate installed to finalize the assembly of the sealing membrane 1 are preferably installed with connecting members 13 to which the attached spacer 47 has not been fixed beforehand.

For assembly of the final metal plate of the sealing membrane, the attached spacers 47 are typically mounted on but not fixed to the first lugs 28 of the corresponding connecting members 13. Said connecting members 13 are positioned on the thermally insulative barrier 2. The attached spacers are then slid along the first lugs 28 to enable the positioning of the first wave reinforcements 11 in such a manner as to adapt the position of said first wave reinforcements 11 to the construction constraints generated by the already installed portions of the sealing membrane 1. The attached spacers are then brought into contact with said first wave reinforcements 11 and fixed to the connecting member 13.

Figure 20:
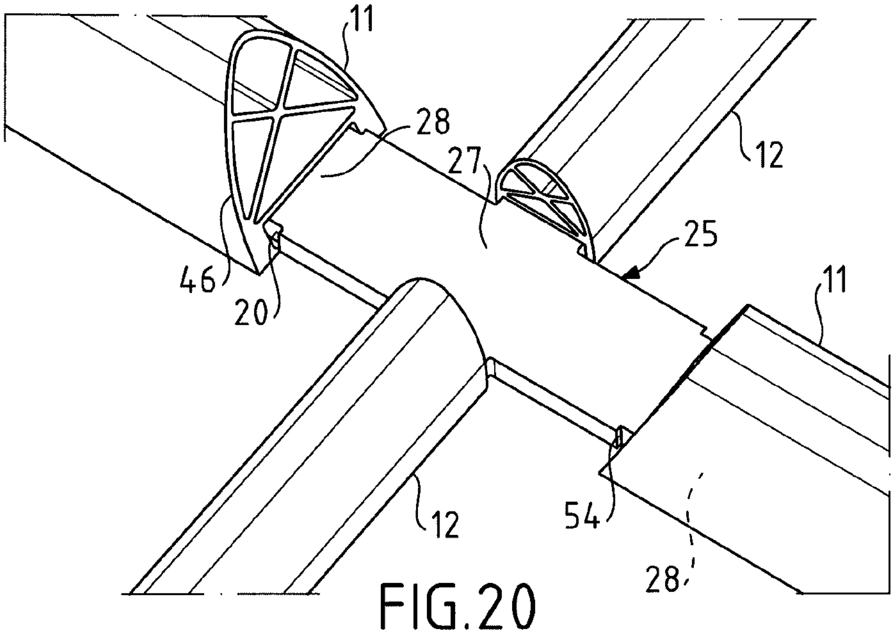
FIG. 20 is a diagrammatic perspective view of wave reinforcements connected at the level of a node by a connecting member in accordance with a variant of FIG. 17.
Figure 21:
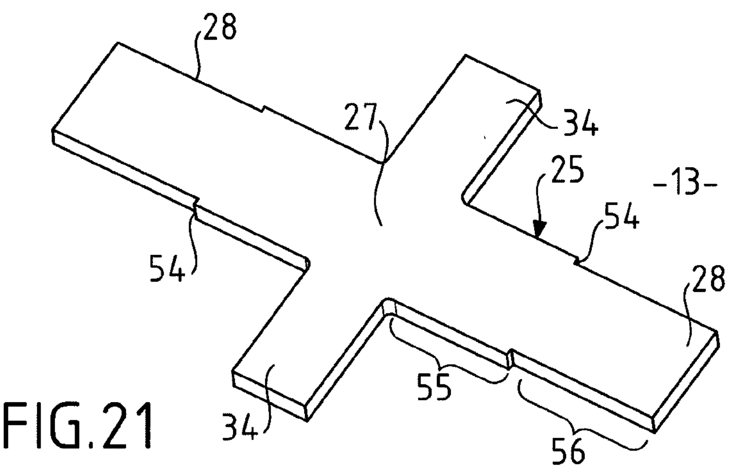
FIG. 21 is a diagrammatic perspective view of the connecting member from FIG. 20.

FIGS. 20 and 21 show a variant of the embodiment from FIGS. 17 to 19. This variant is distinguished from that described above with reference to FIGS. 17 to 19 in that the attached spacer 47 is replaced by a particular shape of the connecting member 13. In this variant embodiment, as shown in FIGS. 20 and 21, the first lugs 28 of the connecting member 13 have a shoulder 54 forming a change of section of said first lugs 28. The first lugs 28 typically have a first portion 55 the width of which is greater than the width of the housing 20 of the soles 15 of the first wave reinforcements 11 and a second portion 56 the width of which is less than, preferably slightly less than, the width of the housing 20. Thus the shoulder 54 forms an abutment surface limiting the insertion of the first lugs 28 into the housing 20. As shown in FIG. 20, the first lugs 28 are inserted in the housing 20 of the soles 15 of the first wave reinforcements 11 until the shoulders 54 come to abut against the end face 46 of said first wave reinforcements 11.

Figure 22:
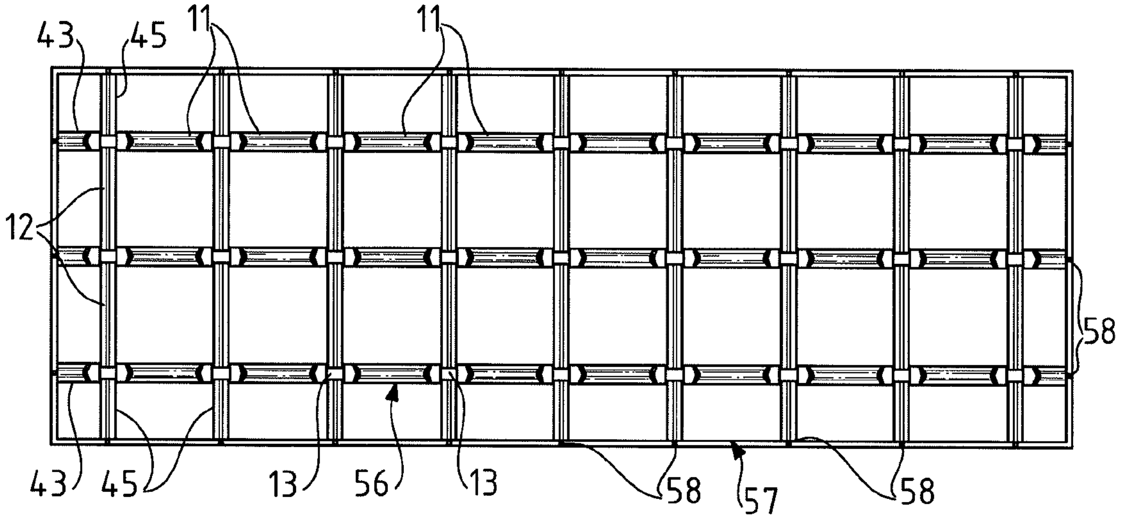
FIG. 22 is a top view of a wave reinforcement lattice in accordance with a variant assembly of the wave reinforcements from FIG. 15.

FIG. 22 shows a lattice 56 made up of wave reinforcements 11, 12, 43, 45 in a variant of the embodiment from FIG. 15. This variant is distinguished from that shown in FIG. 15 in that, for mounting the wave reinforcements 11, 12, 43, 45 on the thermally insulative barrier 2, the metal plate 42 is replaced by a mounting frame 57. This mounting frame 57 shown diagrammatically in FIG. 22 includes excrescences 58 accommodated in the wave half-reinforcements 43 and 45. These excrescences 58 enable retention of the wave half-reinforcements 43 and 45 in an analogous manner to the retaining clips 44 so as to fasten together the lattice 56 made up of the various wave reinforcements 11, 12, the wave half-reinforcements 43, 45, the connecting members 13 and the attached spacers 47. The wave reinforcements 11, 12, 43, 45 can therefore be positioned on the thermally insulative barrier 2 in blocks, each block being made up of a lattice 56 to which there is attached afterwards a corrugated metal plate 42 of the sealing membrane 1.

Figure 23:
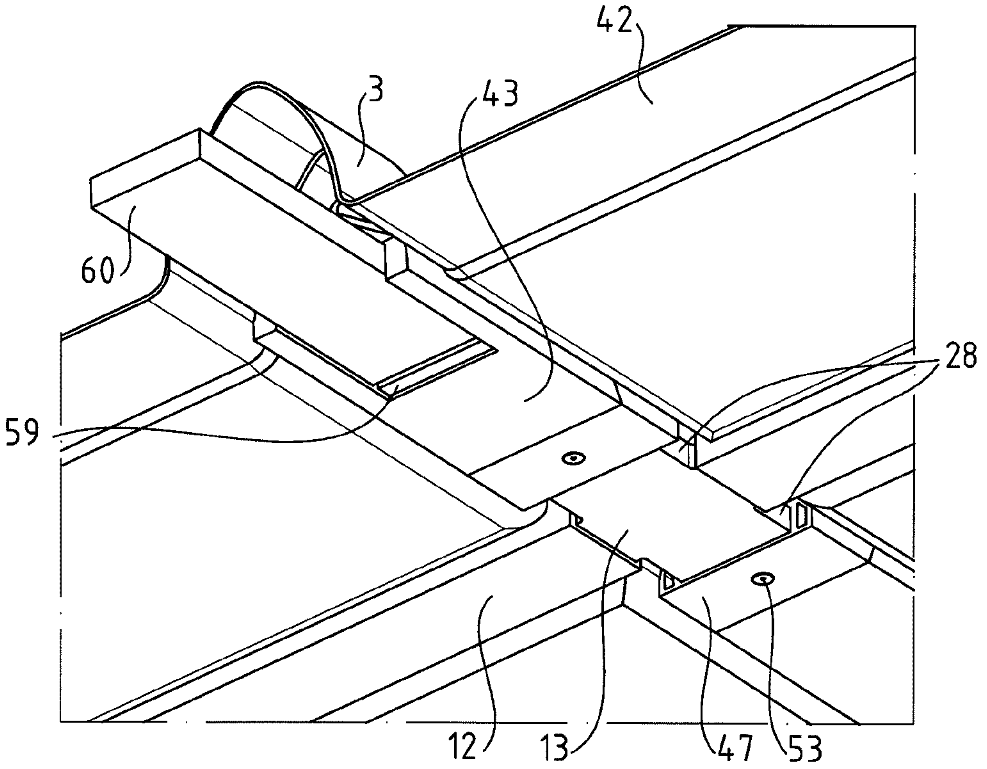
FIG. 23 is a bottom view of a reinforced sealing membrane showing a wave half-reinforcement at the level of the junction between two adjacent metal plates.

FIG. 23 shows from below one embodiment of a wave half-reinforcement 43. In this figure, only one wave half-reinforcement 43 situated under a high corrugation 3 is shown, the description below applying by analogy to the wave half-reinforcements 45 situated under the low corrugations 4.

In this embodiment, the sole 15 of the wave half-reinforcements 43 is at least partially open on the lower face of said wave half-reinforcements 43. In other words, the sole 15 of these wave half-reinforcements 43 has an end opposite the connecting member 13 the lower wall 17 of which is not developed as far as the edge opposite said connecting member 13. Thus said wave half-reinforcements 43 form an open housing 59 in which is accommodated a connecting sleeve 60 intended to connect two adjacent wave half-reinforcements 43 belonging to two adjacent lattices 56. This open housing 59 is therefore delimited by the upper wall 19 and the reinforcement wall 21 of the sole 15 of the wave half-reinforcement 43. The connecting sleeve 60 has a shape complementary to the shape of the open housing 59, for example a parallelepipedal shape.

When a first lattice 56 is positioned on the thermally insulative barrier 2, a sleeve 60 is typically inserted into the open housing 59 and in each of the wave half-reinforcements 43 of said first lattice 56. When a second lattice 56 is attached to the thermally insulative barrier 2, the wave half-reinforcements 43 can be positioned directly by accommodating the sleeves 60 previously installed on the thermally insulative barrier 2 in the open housings 59 of the wave half-reinforcements 43 of that second lattice 56. Connecting sleeves 60 of this kind make it possible to ensure continuity of the wave reinforcements under the corrugations 3, 4.

Moreover, the open housing 59 can be longer than a connecting half-sleeve 60 so as to provide play for positioning the connecting sleeves 60 in the open housings 59. Such positioning plays make it possible to take up any assembly play of the metal plates of the sealing membrane, in particular when positioning the final metal plate of the sealing membrane 1.

Wave half-reinforcements 43, 45 of this kind assembled by connecting sleeves 60 moreover offer greater flexibility for possible repair of the sealing membrane and/or the wave reinforcements 11, 12, 43, 45, only the damaged portion having to be removed for the repair.

In a variant not shown only one of the two wave half-reinforcements 43 or 45 assembled by a connecting sleeve 60 includes the open housing 59, said connecting sleeve being slid into the other wave half-reinforcement of said pair.

Figure 24:
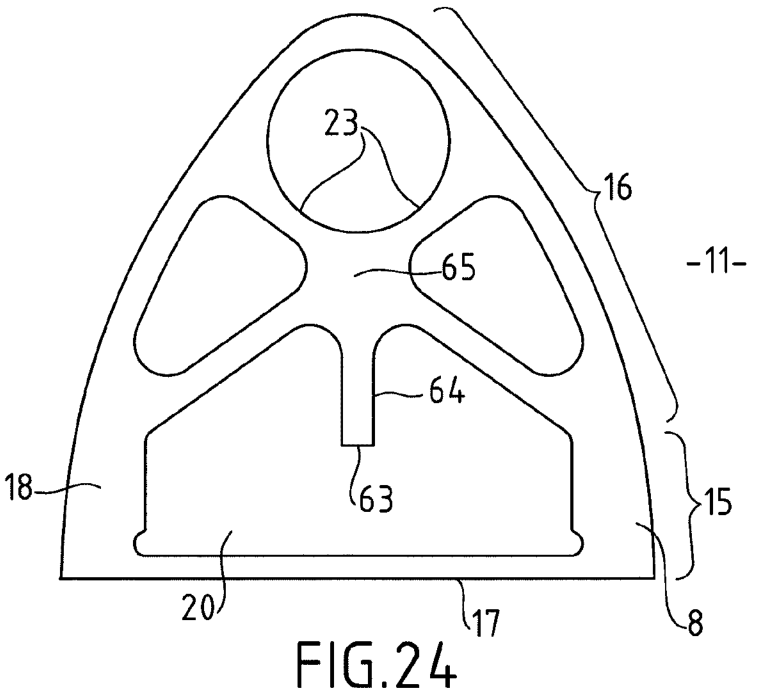
FIGS. 24 and 25 are sectional views of wave reinforcements in accordance with variant embodiments.
Figure 25:
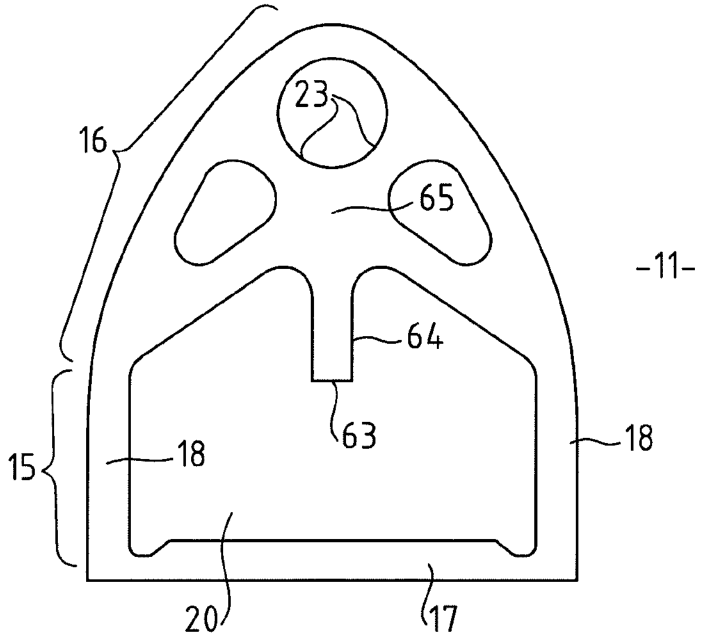

FIGS. 24 and 25 are sectional views of wave reinforcements in accordance with variant embodiments. In these variants, elements identical or fulfilling the same function bear the same references.

In these variants shown in FIGS. 24 and 25, the sole 15 of the first wave reinforcement 11 does not include an upper wall 19. In other words, the housing 20 is open at the top, said housing being limited by the lateral wall 18 and the lower wall 17.

Moreover, these first wave reinforcements 11 include two internal webs 23 as described above with reference to FIG. 4, 7 or 9. A vertical internal wall 64 projects vertically from an intersection 65 between the internal webs 23 in the direction of the lower wall 17. A lower face 63 of this vertical internal wall 64 is plane and parallel to the lower wall 17. This lower face 63 delimits, conjointly with the lower wall 17 and the lateral wall 18, the housing 20 in which the end 28 of the connecting member 13 is accommodated.

The various variants described above may be combined with one another. Thus in an example shown in FIG. 25, the connecting member 13 is a connecting member 13 as described above with reference to FIGS. 20 and 21. The ends 28 of this connecting member 13 pass through attached spacers 47 as described with reference to FIGS. 17 and 18, the shoulders 54 bearing against said attached spacers 47. These attached spacers are moreover associated with first and second wave reinforcements 11, 12 as described with reference to FIGS. 24 and 25.

Figure 26:
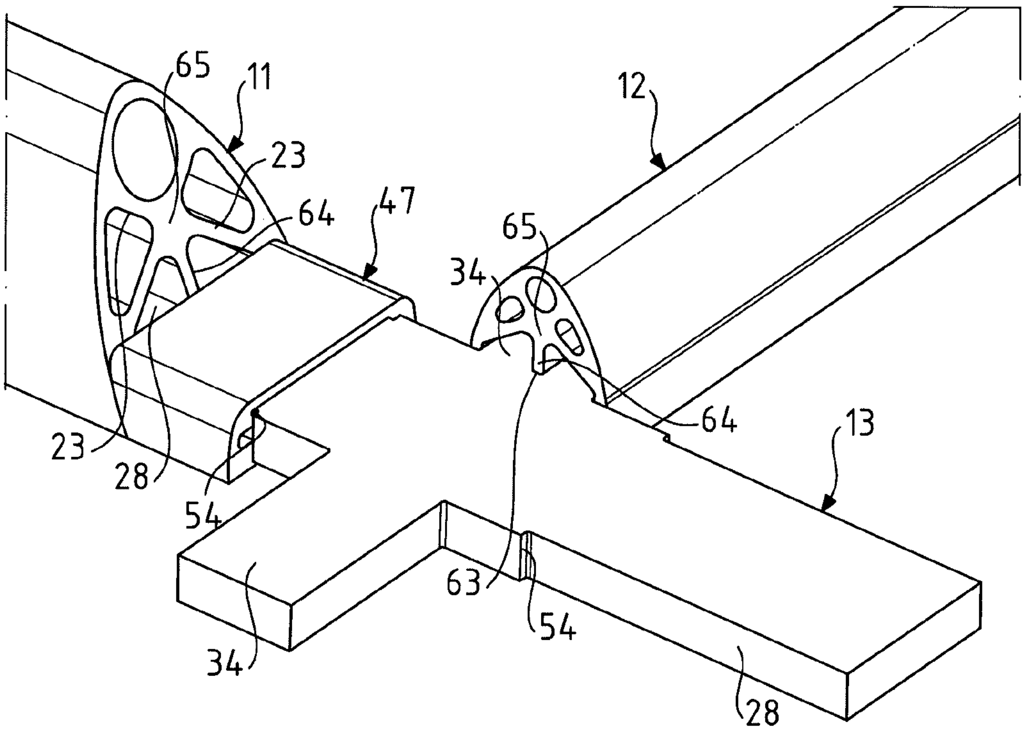
FIG. 26 is a diagrammatic perspective view of wave reinforcements as shown in FIGS. 24 and 25 connected at the level of a node by a connecting member.

As shown in this FIG. 26, the ends 28 and the lugs 34 of the connecting member are accommodated in the soles 15 of the corresponding wave reinforcements 11, 12 so that the lower faces 63 of the vertical internal walls 64 are in contact with the upper face of said ends 28 and lugs 34.

Figure 27:
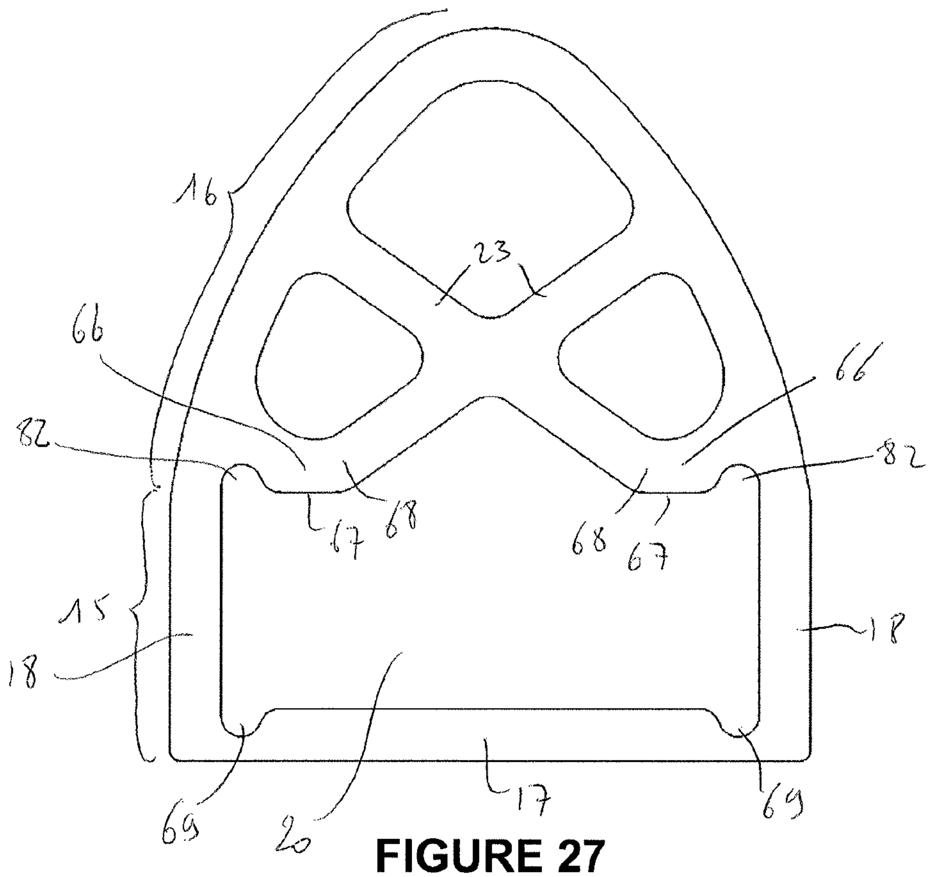
FIGS. 27 and 28 are sectional views of wave reinforcements in accordance with variant embodiments.

FIG. 27 illustrates a wave reinforcement 11, 12 according to a variant embodiment. In this FIG. 27, elements identical to or fulfilling the same function as elements described above bear the same reference. Moreover, the description below with reference to FIGS. 27 and 28 applies equally to the first wave reinforcements 11 and/or the second wave reinforcements 12.

In the variant illustrated in FIG. 27, the upper wall of the sole 15 is not continuous between the lateral faces 18 of said sole 15. More particularly, this upper wall is formed of two lateral portions 66. Each of these lateral portions 66 is developed parallel to the lower wall 17. These lateral portions 66 are developed from a respective lateral wall 18 in the direction of the other lateral wall 18. Thus, in an analogous way to the reinforcements described above with reference to FIGS. 24 and 25, the housing 20 of the sole 15 of this variant embodiment is open on the top, that is to say on the reinforcement portion 16.

The lateral portions 66 each have a lower face 67 facing the lower wall 17, said lower faces 67 conjointly delimiting with the lateral walls 18 and the lower wall 17 the housing 20 in which the end 28 or the lug 34 is accommodated. The housing 20 thus has a plane section extending parallel to the lower wall 17, that is to say having a width dimension greater than its thickness dimension, allowing cooperation with the end 28 or the lug 34 having a similar section and able to transmit the lateral stresses between the connecting member 13 and the wave reinforcement 11, 12. Thus, in the presence of asymmetrical stresses on either side of the node 5, such a connecting member 13 offers rigidity that solidly maintains the alignment between two successive wave reinforcements 11, 12 accommodated under a corrugation 3, 4 and assembled by said connecting member 13.

Furthermore, the wave reinforcement 11, 12 in this variant has two internal webs 23 as described above. Each internal web 23 is developed between a respective lateral portion 66 and the internal face of the reinforcement portion 22. More particularly, each internal web 23 is developed from one end 68 of a respective lateral portion 66, said end 68 being opposite the lateral wall 18 from which said lateral portion 66 is developed, in the direction of the internal face of the wall 22 of the opposite reinforcement portion 16, that is to say extending the lateral wall 18 opposite the lateral wall 18 from which said lateral portion 66 is developed. These two internal webs 23 cross substantially at the centre of the reinforcement portion 16.

In the embodiment illustrated in FIG. 27, the sole 15 has lower recesses 69 and upper recesses 82.

The lower recesses 69 are developed in the thickness direction of the sole 15 and are recessed into the lower wall 17 at the junctions between the lower wall 17 and the lateral walls 18. Similarly, the upper recesses 82 are developed in the thickness direction of the sole 15 and are formed in the lateral portions 66 at the junctions between said lateral portions 66 and the lateral walls 18.

Such recesses 69, 82 make it possible to effect a precise fit, which is limited to the mounting plays between the end 28 or the lug 34 and the surfaces delimiting the housing 20. Thus, for example if the wave reinforcements 11, 12 are produced by extrusion or moulding, the junction zones between the lateral walls 18 and, on the one hand, the lower wall 17 and, on the other hand, the lateral portions 66 do not have a curved portion that can obstruct the housing 20 and interfere with the end 28 or the lug 34 during the insertion of said end 28 or lug 34 into the housing 20.

Figure 28:
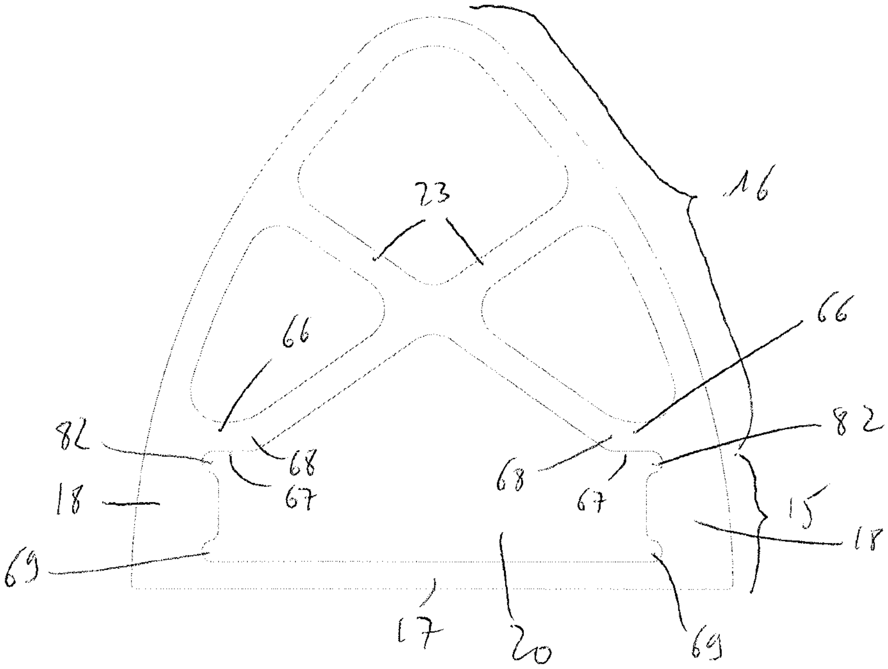

The embodiment illustrated in FIG. 28 differs from the embodiment illustrated in FIG. 27 in that the recesses 69, 82 are recessed into the lateral walls 18 and are thus developed in a width direction of the sole 15. However, these recesses 69, 82 fulfil the same function as those described above with reference to FIG. 27, avoiding the presence of curved angle zones for example in the case of wave reinforcements 11, 12 produced by extrusion or moulding.

Figure 29:
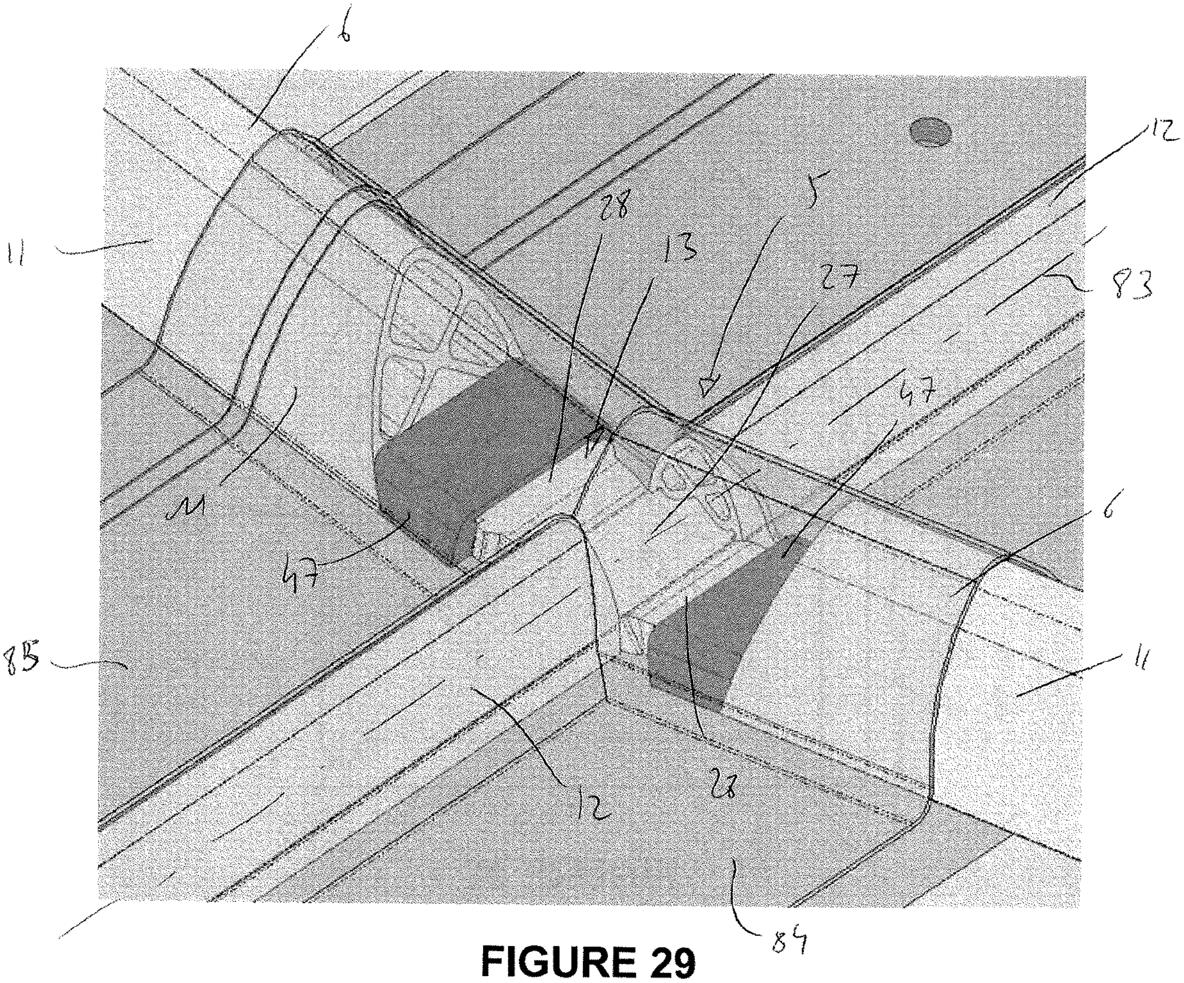
FIG. 29 is a diagrammatic perspective view with transparency of a node of the primary fluid-tight membrane situated at the level of a corner of the tank wall, said corner being formed by two facets of said tank wall, a connecting member in accordance with one variant embodiment being accommodated in said node.
Figure 30:
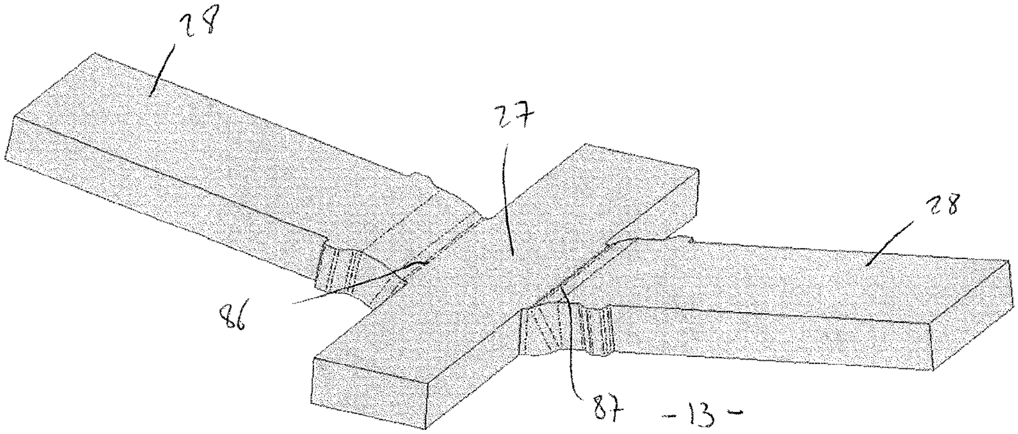
FIG. 30 is a diagrammatic perspective view of the connecting member of FIG. 29.

FIGS. 29 and 30 illustrate a variant embodiment in which the tank wall has two facets that form an angle between one another, for example an angle of 167°. Elements identical to or fulfilling the same function as elements described above bear the same reference.

In this variant embodiment, corrugations are developed perpendicularly to a ridge 83 formed between a first facet 84 of the tank wall and a second facet 85 of said tank wall. Furthermore, corrugations are developed parallel to said ridge 83. More particularly, in the example illustrated in FIG. 29, a corrugation is developed along the ridge 83 and covers said ridge 83. In the example illustrated in these figures, the high corrugations 3 are developed perpendicularly to the ridge 83 and a low corrugation 4 covers the ridge 83, the description below applying by analogy to a reverse situation.

In this variant, a node 5 is thus formed in line with the ridge 83. Similarly, a high corrugation 3 is continuous between the first facet 84 and the second facet 85 of the wall.

In the embodiment illustrated in FIG. 29, the node 5 does not have a fold 7 and the longitudinal portions 6 of the corrugation 11 preserve a substantially continuous section as far as the intersection plane between the facets 84, 85. However, on account of the angle between said facets and in a similar way to the nodes described above, this node cannot be passed through by a first wave reinforcement 11. Hence, as for the nodes 5 described above, it is necessary to use a connecting member 13 to ensure continuity of the alignment between the wave reinforcements 11. This high corrugation 3 thus has longitudinal portions 6 that are developed in a first longitudinal direction parallel to the first facet 84 and perpendicular to the ridge 83 and longitudinal portions 6 that are developed parallel to the second facet 85 and perpendicular to the ridge 83.

Such a high corrugation 3 may, as explained above, be subject to asymmetrical stresses on either side of the node 5 covering the ridge 83. It is thus necessary to ensure the alignment of the wave reinforcements 11 situated on the two facets 84, 85 on either side of the node 5, that is to say to ensure that the wave reinforcement 11 situated on the first facet 84 and the wave reinforcement 11 situated on the second facet 85 preserve a longitudinal direction comprised in one and the same plane perpendicular to the ridge 83.

For this purpose, the connecting member 13 according to this variant embodiment differs from the connecting member described above with reference for example to FIG. 11, 17, 19 to 21 or 26 in that the ends 28 form an angle with the central portion 27 of said connecting member 13.

More particularly, the central portion 27 is plane and has a rectangular section. A first end 28 is developed from a first edge 86 of the central section 27 at an angle corresponding to half the angle between the two wall facets 84, 85. A second end 28 is developed from a second edge 87 of the central section 27, opposite the first edge 86, with an angle corresponding to half the angle between the two wall facets 84, 85. In other words, the ends 28 are each developed from the plane central portion 27 and have, between one another, an angle corresponding to the angle between the two wall facets 84, 85. Thus, the first end 28 is developed parallel to the first facet 84 and the second end 28 is developed parallel to the second facet 85. The first end 28 is inserted into the housing 20 formed by the hollow sole 15 of the wave reinforcement 11 situated in the longitudinal corrugation portion 6 forming the node 5 and situated in the first facet 84 and the second end 28 is inserted into the housing 20 formed by the hollow sole 15 of the wave reinforcement 11 situated under the longitudinal corrugation portion 6 forming the node 5 and situated in the second wall facet 85.

In an analogous manner to the ends 28 described above with reference to FIGS. 1 to 26, the ends 28 of this connecting member 13 are nested with simple mounting play in order to ensure good cooperation between said ends 28 and the sole 15 and thus to preserve an alignment of the wave reinforcements 11 with respect to the lateral stresses.

The technique described above for producing a fluid-tight and thermally insulative tank may be used in reservoirs of different types, for example to constitute the primary sealing membrane of an LNG reservoir in a land installation or in a floating structure such as a methane tanker or other ship.

Figure 16:
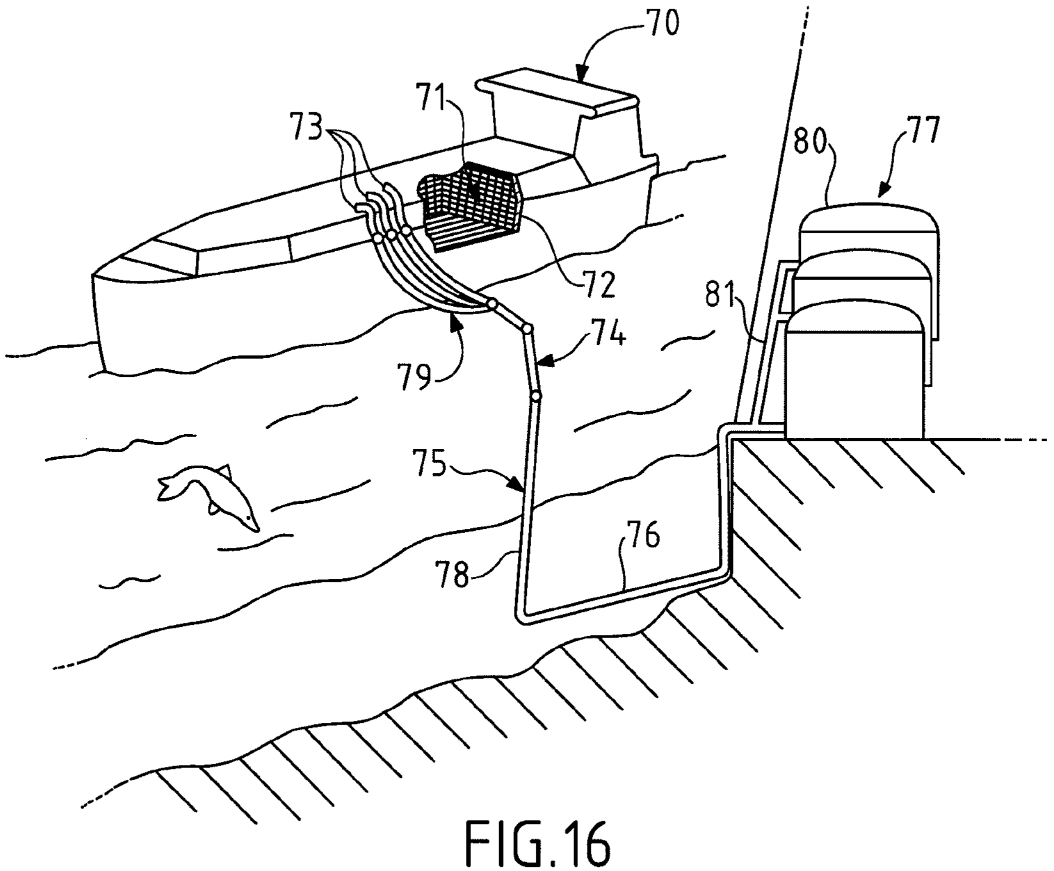
FIG. 16 is a diagrammatic cutaway representation of a methane tanker ship tank and a terminal for loading/offloading that tanker.

Referring to FIG. 16, a cutaway view of a methane tanker ship 70 shows a fluid-tight and insulated tank 71 of prismatic general shape mounted in the double hull 72 of the ship. The wall of the tank 71 includes a primary fluid-tight barrier intended to be in contact with the LNG contained in the tank, a secondary fluid-tight barrier between the primary fluid-tight barrier and the double hull 72 of the ship, and two insulative barriers respectively between the primary fluid-tight barrier and the secondary fluid-tight barrier and between the secondary fluid-tight barrier and the double hull 72.

In a manner known in itself, loading/offloading pipes 73 disposed on the top deck of the ship can be connected by means of appropriate connectors to a maritime or harbour terminal to transfer a cargo of LNG from or to the tank 71.

FIG. 16 shows an example of a maritime terminal including a loading and offloading station 75, an underwater pipe 76 and a land installation 77. The loading and offloading station 75 is a fixed offshore installation including a mobile arm 74 and a tower 78 that supports the mobile arm 74. The mobile arm 74 carries a bundle of flexible insulated pipes 79 that can be connected to the loading/offloading pipes 73. The mobile arm 74 can be slewed and adapts to all methane tanker loading gauges. A connecting pipe not shown extends inside the tower 78. The loading and offloading station 75 enables loading and offloading of the methane tanker ship 70 from or to the land installation 77. The latter includes liquefied gas storage tanks 80 and connecting pipes 81 connected by the underwater pipe 76 to the loading or offloading station 75. The underwater pipe 76 enables transfer of the liquefied gas between the loading or offloading station 75 and the land installation 77 over a great distance, for example 5 km, which enables the methane tanker ship 70 to remain at a great distance from the coast during loading and offloading operations.

Pumps onboard the ship 70 and/or pumps equipping the land installation 77 and/or pumps equipping the loading and offloading station 75 are used to generate the pressure necessary to transfer the liquefied gas.

Although the invention has been described in connection with a plurality of particular embodiments, it is obvious that it is in no way limited to them and that it encompasses all technical equivalents and combinations of the means described within the scope of the invention.

Use of the verbs "include", "comprise" and conjugated forms thereof do not exclude the presence of elements or other steps other than those stated in a claim.

In the claims, any reference sign in brackets should not be interpreted as a limitation of the claim.

The invention claimed is:

1. A fluid-tight and thermally insulating tank wall, comprising:

a thermally insulating barrier and a corrugated fluid-tight membrane, the thermally insulating barrier having a support surface, the corrugated fluid-tight membrane including a first series of parallel corrugations and a second series of parallel corrugations and plane portions situated therebetween that rest on the support surface of the thermally insulating barrier, said first and second series of parallel corrugations extending in intersecting directions and forming a plurality of nodes at intersections thereof, and wave reinforcements being arranged under the corrugations of the first series of corrugations, wherein two successive wave reinforcements in a corrugation of the first series of corrugations each include a sole including a lower wall resting on the support surface of the thermally insulating barrier and a reinforcement portion disposed above the sole in a thickness direction of the tank wall, the two wave reinforcements—being developed longitudinally in the corrugation on either side of a node, said soles being hollow, a hollow portion of said soles having a plane section parallel to the support surface of the thermally insulating barrier, a connecting member extending in said corrugation at a level of the node and being nested in the soles of said two wave reinforcements in such a manner as to assemble the two wave reinforcements in an aligned position, and an end of the connecting member nested in said sole having a plane section extending parallel to said lower wall, said end of the connecting member having a width, the width being measured in a direction perpendicular to a longitudinal direction of said corrugation and perpendicular to the thickness direction of the tank wall, the width being greater than a thickness of said end of the connecting member, the thickness of said end of the connecting member being measured in the thickness direction of the tank wall.

2. The fluid-tight and thermally insulating tank wall according to claim 1, wherein the sole of one of said wave reinforcements further includes an upper wall parallel to the lower wall-resting on the support surface of the thermally insulating barrier, the reinforcement portion of said wave reinforcement-extending above the upper wall.

3. The fluid-tight and thermally insulating tank wall according to claim 1, wherein at least one of said wave reinforcements is associated with an attached spacer engaged in said node-, an end face of the attached spacer opposite the node forming an abutment surface for an end face of the wave reinforcement facing the node, said attached spacer including a passage extending the hollow portion of the sole of the wave reinforcement in the direction of the other wave reinforcement and having the connecting member passed through it.

4. The fluid-tight and thermally insulating tank wall according to claim 3, wherein the attached spacer is fixed to the connecting member.

5. The fluid-tight and thermally insulating tank wall according to claim 4, wherein the node includes a summit, said corrugation including on either side of the summit a concave portion forming a constriction of the corrugation, the attached spacer extending in the node—as far as the constriction of the corrugation—situated on the corresponding side of the summit or beyond said constriction of the corrugation.

6. The fluid-tight and thermally insulating tank wall according to claim 1, wherein the connecting member includes an abutment surface adapted to limit insertion of the connecting member into one of said soles.

7. The fluid-tight and thermally insulating tank wall according to claim 6, wherein the connecting member includes an overthickness or an overwidth, the connecting member having, at a level of said overthickness or overwidth, a section, the dimensions of which are greater than the dimensions of the hollow portion of the sole or soles, said overthickness or overwidth carrying the abutment surface.

8. The fluid-tight and thermally insulating tank wall according to claim 1, wherein the wave reinforcements arranged under the corrugations of the first series of parallel corrugations are first wave reinforcements, the tank wall further including second wave reinforcements arranged under corrugations of the second series of parallel corrugations, two second wave reinforcements being disposed in the corrugation of the second series of parallel corrugations forming the node on either side of said node.

9. The fluid-tight and thermally insulating tank wall according to claim 8, wherein the second wave reinforcements are hollow, the connecting member including a central portion inserted between the soles of the first wave reinforcements, the connecting member further including two lugs, each of said two lugs projecting from the central portion of the connecting member in a longitudinal direction of the second series of parallel corrugations and penetrating into a respective second wave reinforcement.

10. The fluid-tight and thermally insulating tank wall according to claim 9, wherein the two lugs are nested in the second wave reinforcements in such a manner as to assemble said two second wave reinforcements to the connecting member.

11. The fluid-tight and thermally insulating tank wall according to claim 10, wherein the connecting member includes a plane part having the shape of a cross, said lugs and said ends of the connecting member forming four branches of the cross.

12. The fluid-tight and thermally insulating tank wall according to claim 1, wherein the corrugated fluid-tight membrane includes a corrugated rectangular sheet metal part, said first series of parallel corrugations extending in a lengthwise direction of the sheet metal part, said second series of parallel corrugations extending in a widthwise direction of the sheet metal part, wherein the wave reinforcements arranged under a corrugation of the first series of parallel corrugations include a row of aligned wave reinforcements, said row of wave reinforcements being developed over substantially all a length of the rectangular sheet metal part, said wave reinforcements each including a hollow sole including a lower wall resting on the support surface of the thermal insulating barrier and a reinforcement portion disposed above the sole, and being assembled two by two by a plurality of connecting members nested in the soles of the successive wave reinforcements at the level of the nodes of said corrugation.

13. The fluid-tight and thermally insulating tank wall according to claim 12, wherein the wave reinforcements arranged under the corrugations of the first series of parallel corrugations are first wave reinforcements, the tank wall further including second wave reinforcements arranged under corrugations of the second series of parallel corrugations, two second wave reinforcements being disposed in the corrugation of the second series of parallel corrugations forming the node on either side of said node, wherein the second wave reinforcements are hollow, the connecting member including a central portion inserted between the soles of the first wave reinforcements, the connecting member further including two lugs, each of said two lugs projecting from the central portion of the connecting member in a longitudinal direction of the second series of parallel corrugations and penetrating into a respective second wave reinforcement, wherein the two lugs are nested in the second wave reinforcements in such a manner as to assemble said two second wave reinforcements to the connecting member, wherein the connecting member includes a plane part having the shape of a cross, said lugs and said ends of the connecting member forming four branches of the cross, and wherein a plurality of rows of wave reinforcements are arranged in the respective corrugations of the first series of parallel corrugations over substantially all the length of the rectangular sheet metal part and rows of second wave reinforcements are arranged in the corrugations of the second series of parallel corrugations, the second wave reinforcements being assembled to the first wave reinforcements by cooperation with the connecting members at the level of the nodes to form a framework of the corrugated rectangular sheet metal part.

14. The fluid-tight and thermally insulating tank wall according to claim 13, wherein the corrugated fluid-tight membrane includes a second corrugated rectangular sheet metal part-juxtaposed to the first corrugated rectangular sheet metal part in the lengthwise direction and welded to the latter in fluid-tight manner, the second corrugated rectangular sheet metal part being provided with a second framework formed of first and second wave reinforcements arranged in the corrugations of the second corrugated rectangular sheet metal part and assembled by a plurality of connecting members nested in said wave reinforcements at the level of the nodes of the second corrugated rectangular sheet metal part, and wherein a first end reinforcement forming the end of a row of first wave reinforcements of the first framework is associated with a second end reinforcement forming the end of a row of first wave reinforcements of the second framework by a connecting sleeve, the first and second end reinforcements each including a longitudinal housing opening onto a lower surface of the end reinforcement, the connecting sleeve being nested in the longitudinal housing of the first and second end reinforcements in such a manner as to align the row of wave reinforcements of the first framework and the row of wave reinforcements of the second framework.

15. A ship for the transportation of a cold liquid product, the ship including a double hull and a tank disposed in the double hull, the tank including a fluid-tight and thermally insulating tank wall according to claim 1.

16. A method of loading or offloading a ship according to claim 15, wherein a cold liquid product is fed through insulated pipes from or to a floating or land storage installation to or from the tank of the ship.

17. A cold liquid product transfer system, the cold liquid product transfer system including a ship according to claim 15, insulated pipes adapted to connect the tank-installed in the double hull of the ship to a floating or land storage installation and a pump for driving a flow of cold liquid product through the insulated pipes from or to the floating or land storage installation to or from the tank of the ship.

18. A method for assembling a fluid-tight and thermally insulating tank wall according to claim 1, the method comprising the steps of:

for at least one corrugation of a first series of parallel corrugations of a corrugated rectangular sheet metal part of the corrugated fluid-tight membrane, positioning a row of first wave reinforcements on the support surface of a thermally insulating barrier of a fluid-tight and thermally insulating tank, said row of first wave reinforcements being formed by alternately nesting connecting members and first wave reinforcements;

maintaining ends of said row of first wave reinforcements in position on the support surface of the thermally insulating barrier;

positioning on the support surface of the thermally insulating barrier, for at least one corrugation of a second series of parallel corrugations of the corrugated rectangular sheet metal part, second wave reinforcements;

fixing onto the support surface of the thermally insulating barrier the corrugated rectangular sheet metal part so that the row of first wave reinforcements is accommodated in a corresponding corrugation of the first series of parallel corrugations of the corrugated rectangular sheet metal part and the second wave reinforcements are accommodated in a corresponding corrugation of the second series of parallel corrugations of the corrugated rectangular sheet metal part.

19. The method according to claim 18, wherein a row of first wave reinforcements is positioned on the support surface of the thermally insulating barrier for each corrugation of the first series of parallel corrugations, and wherein second wave reinforcements are positioned on the support surface of the thermally insulating barrier for each corrugation of the second series of parallel corrugations.

* * * * *